United States Patent
Zhang et al.

(10) Patent No.: US 12,200,799 B2
(45) Date of Patent: Jan. 14, 2025

(54) WIRELESS COMMUNICATION METHOD AND APPARATUS

(71) Applicant: Huawei Technologies Co., Ltd., Shenzhen (CN)

(72) Inventors: Hongping Zhang, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 17/696,383

(22) Filed: Mar. 16, 2022

(65) Prior Publication Data

US 2022/0210856 A1     Jun. 30, 2022

Related U.S. Application Data

(63) Continuation of application No. PCT/CN2019/106277, filed on Sep. 17, 2019.

(51) Int. Cl.
   *H04W 76/19*            (2018.01)
   *H04W 36/14*            (2009.01)
   (Continued)

(52) U.S. Cl.
   CPC .......... *H04W 76/19* (2018.02); *H04W 68/005* (2013.01); *H04W 76/20* (2018.02); *H04W 76/38* (2018.02); *H04W 36/142* (2023.05)

(58) Field of Classification Search
   CPC ... H04W 76/19; H04W 68/005; H04W 76/20; H04W 76/25; H04W 76/30; H04W 76/38;
   (Continued)

(56) References Cited

U.S. PATENT DOCUMENTS 10,356,751 B2    7/2019    Su et al.
11,483,894 B2   10/2022   Sun et al.
(Continued)

FOREIGN PATENT DOCUMENTS

CN        103428673 A     12/2013
CN        104115454 A     10/2014
(Continued)

OTHER PUBLICATIONS

"Paging Cause Introduction," SA WG2 Meeting #129-BIS, S2-1812349 (revision of S2-181xxxx), Change Request 23.501, CR 0729, rev, Current Version: 15.3.0, Nov. 26-30, 2018, West Palm Beach, FL, US, 3 pages.

*Primary Examiner* — Mohamed A Kamara
(74) *Attorney, Agent, or Firm* — SLATER MATSIL, LLP

(57) ABSTRACT

A wireless communication method and apparatus. The method includes sending, with a first subscriber identity a first message to a first access network device, the first message requesting establishment or resumption of a second radio resource control (RRC) connection with the second subscriber identity, the first message including auxiliary information indicating to determine to release or deactivate a first RRC connection established with the first subscriber identity, and the second RRC connection being a connection established with the second subscriber identity, and receiving, with the first subscriber identity, a second message from the first access network device and that indicates to release or deactivate the first RRC connection, where the terminal device is in an RRC connected state with the first subscriber identity and in an RRC idle state or an RRC deactivated state with the second subscriber identity.

20 Claims, 9 Drawing Sheets

(51) Int. Cl.
*H04W 68/00* (2009.01)
*H04W 76/20* (2018.01)
*H04W 76/38* (2018.01)

(58) Field of Classification Search
CPC . H04W 8/183; H04W 36/142; H04W 60/005; H04W 76/34; H04W 76/36; H04W 76/15; H04W 8/18; H04W 8/20
See application file for complete search history.

(56) References Cited

U.S. PATENT DOCUMENTS

| | | | |
|---|---|---|---|
| 2014/0220981 A1* | 8/2014 | Jheng | H04W 76/25 |
| | | | 455/437 |
| 2016/0249408 A1* | 8/2016 | Thiruvenkatachari | ........................ |
| | | | H04W 76/38 |
| 2017/0325278 A1 | 11/2017 | Ramkumar et al. | |
| 2022/0072175 A1* | 3/2022 | Lovlekar | A61L 2/22 |

FOREIGN PATENT DOCUMENTS

| | | |
|---|---|---|
| CN | 106332301 A | 1/2017 |
| CN | 108924817 A | 11/2018 |
| CN | 109699026 A | 4/2019 |
| CN | 110149728 A | 8/2019 |

* cited by examiner ns, or the two SIM cards may
WIRELESS COMMUNICATION METHOD AND APPARATUS

CROSS-REFERENCE TO RELATED APPLICATIONS

This application is a continuation of International Application No. PCT/CN2019/106277, filed on Sep. 17, 2019, the disclosure of which is hereby incorporated by reference in its entirety.

TECHNICAL FIELD

This application relates to the communication field, and more specifically, to a wireless communication method and apparatus.

BACKGROUND

Currently, more and more terminal devices, such as smartphones, support two subscriber identity module (SIM) cards. For example, one of the SIM cards is used for private services and the other is used for work services, or one of the SIM cards is used for data services and the other is used for voice services. This service mode may be referred to as dual SIM mode. The two SIM cards may belong to a same mobile carrier or different mobile carriers, or the two SIM cards may use a same standard or different standards. For example, the standards may include new radio (NR), a long term evolution (LTE) system, a wideband code division multiple access (WCDMA) system, a code division multiple access (CDMA), and a global system for mobile communications (GSM). For a dual SIM dual standby (DSDS) terminal device, two SIM cards share one set of transceivers. When one SIM card of the terminal device has established a radio resource control (RRC) connection to a base station and enters an RRC connected state, and when the other SIM card needs to perform data transmission, that is, to enter the RRC connected state, the terminal device switches to this SIM card to establish and maintain another corresponding RRC connection, but cannot continue maintaining the RRC connection with the base station of the previous SIM. Therefore, for a DSDS terminal device, when one of the SIM cards is in an RRC connected state and the other SIM card also needs to perform data transmission, the SIM in the RRC connected state may be unexpectedly disconnected, affecting user experience. In addition, ping-pong handover between RRC connections may further occur.

SUMMARY

This application provides a wireless communication method and apparatus, to optimize user experience during RRC connection handover.

According to a first aspect, a wireless communication method is provided. The method is applicable to a terminal device, and the terminal device supports a first subscriber identity and a second subscriber identity. The method includes: sending, with the first subscriber identity, a first message to a first access network device, where the first message is used to request to establish or resume a second RRC connection with the second subscriber identity, the first message includes auxiliary information, the auxiliary information is used to indicate the first access network device to determine to release or deactivate a first RRC connection, the first RRC connection is a connection established with the first subscriber identity, and the second RRC connection is a connection established with the second subscriber identity, and receiving, with the first subscriber identity, a second message from the first access network device, where the second message is used to indicate to release or deactivate the first RRC connection. being in an RRC connected state with the first subscriber identity, and being in an RRC idle state or an RRC deactivated state with the second subscriber identity.

Optionally, the requesting to establish or resume a second RRC connection with the second subscriber identity includes: requesting to release or deactivate the first RRC connection.

According to the solution in this embodiment of this application, the terminal device sends, with the first subscriber identity, the first message to the first access network device, to request to establish or resume the second RRC connection with the second identity. The auxiliary information enables the first access network device to determine, based on the auxiliary information, to deactivate or release the first RRC connection, to resume the first RRC connection more quickly, reduce signaling overheads, or save resources of the first access network device. This can avoid unexpected disconnection of the first RRC connection during RRC connection handover, and ensure user experience.

With reference to the first aspect, in some implementations of the first aspect, the auxiliary information includes at least one of the following information: a reason for establishing or resuming the second RRC connection, a type of the second RRC connection, service type information or service priority information of the second RRC connection, expected duration of the second RRC connection, and capability information indicating whether the terminal device supports deactivation of the first RRC connection.

With reference to the first aspect, in some implementations of the first aspect, the reason for establishing or resuming the second RRC connection includes: The terminal device receives, with the second subscriber identity, a paging message sent by a camped cell, uplink data belonging to the second subscriber identity arrives, or the terminal device needs to send signaling with the second subscriber identity.

With reference to the first aspect, in some implementations of the first aspect, the type of the second RRC connection includes a signaling sending connection and a data transmission connection.

According to the solution in this embodiment of this application, the terminal device notifies the first access network device of the type of the second RRC connection, so that the first access network device may determine to deactivate or release the first RRC connection, to resume the first RRC connection more quickly, reduce signaling overheads, or save resources of the first access network device. This can also avoid unexpected disconnection of the first RRC connection, and ensure user experience.

With reference to the first aspect, in some implementations of the first aspect, the auxiliary information is further used by the first access network device to determine, after the first RRC connection is released or deactivated, whether to initiate paging for the first subscriber identity.

According to the solution in this embodiment of this application, the auxiliary information reported by the terminal device enables the first access network device to determine, based on the auxiliary information, whether to initiate paging for the first subscriber identity after the first RRC connection is released or deactivated. In this way, even if downlink data arrives at the first access network device and a second access network device in turn, the paging message is not directly sent to trigger RRC connection handover, so that ping-pong handover between RRC connections can be avoided.

With reference to the first aspect, in some implementations of the first aspect, the second message includes delay indication information. The delay indication information is used to indicate to delay releasing the first RRC connection or to delay deactivating the first RRC connection.

According to the solution in this embodiment of this application, the terminal device may delay releasing the first RRC connection or delay deactivating the first RRC connection based on the delay indication information. This can ensure stability of data transmission in the first RRC connection, avoid unexpected interruption of the data transmission, and ensure user experience.

With reference to the first aspect, in some implementations of the first aspect, the second message includes delay duration information. The delay duration information is used to indicate duration of delaying releasing the first RRC connection or delaying deactivating the first RRC connection.

According to the solution in this embodiment of this application, the terminal device may determine, based on the delay duration information, to release or deactivate the first RRC connection after the delay duration. For example, the delay duration may be delay duration determined by the first access network device based on current data transmission or the like. The terminal device releases or deactivates the first RRC connection after the delay duration. This can further ensure stability of data transmission of the first RRC connection, avoid unexpected interruption of the data transmission, and ensure user experience.

With reference to the first aspect, in some implementations of the first aspect, the terminal device continues to perform data transmission with the first access network device within the delay duration.

According to the solution in this embodiment of this application, the terminal device may determine, based on the delay duration information, to release or deactivate the first RRC connection after the delay duration, and continue to maintain the first RRC connection within the delay duration. This can further ensure stability of the data transmission of the first RRC connection, avoid unexpected interruption of the data transmission, and ensure user experience.

With reference to the first aspect, in some implementations of the first aspect, the second message includes return indication information, where the return indication information is used to indicate to trigger to establish or resume the first RRC connection after the second RRC connection is released or deactivated.

According to the solution in this embodiment of this application, the terminal device may trigger, based on the return indication information, to establish or resume the first RRC connection after the second RRC connection is released or deactivated. In this way, the data transmission of the first RRC connection continues as soon as possible after data transmission of the second RRC connection is completed. This ensures timeliness of the second RRC connection, maximally ensures integrity of the data transmission of the first RRC connection, and optimizes user experience.

With reference to the first aspect, in some implementations of the first aspect, the second message includes return duration information, where the return duration information is used to indicate to establish or resume the first RRC connection within the return duration.

According to the solution in this embodiment of this application, the terminal device may establish or resume the first RRC connection within the return duration, so that the data transmission of the first RRC connection can continue as soon as possible. This ensures timeliness of the second RRC connection, maximally ensures the integrity of the data transmission of the first RRC connection, and optimizes user experience.

With reference to the first aspect, in some implementations of the first aspect, the method further includes: after the releasing or deactivating the first RRC connection, establishing or resuming the second RRC connection with the second subscriber identity to the second access network device, and sending first indication information to the second access network device, where the first indication information is used to indicate the second access network device to accelerate release or deactivation of the second RRC connection.

With reference to the first aspect, in some implementations of the first aspect, the first indication information includes first duration information. The first duration information is used to indicate maximum duration in which the second RRC connection can be maintained, or is used to indicate that the first RRC connection needs to be established or resumed within duration indicated by the first duration information.

With reference to the first aspect, in some implementations of the first aspect, the first indication information includes second indication information, where the second indication information is used to indicate a status of the first RRC connection.

With reference to the first aspect, in some implementations of the first aspect, the first indication information is carried in a second RRC setup complete message or a second RRC resume complete message.

According to a second aspect, a wireless communication method is provided. The method is applicable to a terminal device, and the terminal device supports a first subscriber identity and a second subscriber identity. The method includes: after releasing or deactivating a first RRC connection, establishing or resuming, with the second subscriber identity, a second RRC connection to a second access network device, where the first RRC connection is a connection established with the first subscriber identity, and the second RRC connection is a connection established with the second subscriber identity, and sending first indication information to the second access network device, where the first indication information is used to indicate the second access network device to accelerate release or deactivation of the second RRC connection.

According to the solution in this embodiment of this application, the terminal device may send the first indication information to notify the second access network device, so that the second access network device can release or deactivate the second RRC connection as soon as possible. In this way, the terminal device can return to the first RRC connection as soon as possible. For example, when the first RRC connection is released or deactivated due to data transmission performed with the second subscriber identity, the terminal device can return to the first RRC connection as soon as possible by sending the first indication information to the second access network device, to ensure data transmission of the first RRC connection.

With reference to the second aspect, in some implementations of the second aspect, the first indication information includes first duration information. The first duration information is used to indicate maximum duration in which the second RRC connection can be maintained, or is used to indicate that the first RRC connection needs to be established or resumed within duration indicated by the first duration information.

According to the solution in this embodiment of this application, the terminal device notifies the second access network device of the maximum duration in which the second RRC connection can be maintained or notifies the second access network device that the first RRC connection needs to be established or resumed within the duration indicated by the duration information, so that the second access network device can release or deactivate the second RRC connection as soon as possible, and the terminal device can return to the first RRC connection as soon as possible.

With reference to the second aspect, in some implementations of the second aspect, the first indication information includes second indication information, where the second indication information is used to indicate a status of the first RRC connection.

According to the solution in this embodiment of this application, the terminal device notifies the second access network device of the status of the first RRC connection, so that the second access network device can release or deactivate the second RRC connection as soon as possible based on the status of the first RRC connection, and the terminal device can return to the first RRC connection as soon as possible.

With reference to the second aspect, in some implementations of the second aspect, the first indication information is carried in a second RRC setup complete message or a second RRC resume complete message.

According to the solution in this embodiment of this application, the second RRC setup complete message or the second RRC resume complete message carries indication information.

According to a third aspect, a wireless communication method is provided. The method includes: receiving a first message from a terminal device, where the first message is used to request to establish or resume a second RRC connection with a second subscriber identity, the first message includes auxiliary information, the auxiliary information is used to indicate a first access network device to determine to release or deactivate a first RRC connection, the first RRC connection is a connection established by the terminal device with a first subscriber identity, and the second RRC connection is a connection established by the terminal device with the second subscriber identity, determining, based on the auxiliary information, to release or deactivate the first RRC connection, and sending a second message to the terminal device, where the second message is used to indicate to release or deactivate the first RRC connection, and the terminal device is in an RRC connected state with the first subscriber identity, and is in an RRC idle state or an RRC deactivated state with the second subscriber identity.

According to the solution in this embodiment of this application, the first access network device can determine, based on the first message, that the terminal device needs to release or deactivate the first RRC connection, and determine, based on the auxiliary information, to deactivate or release the first RRC connection, so that the first RRC connection is resumed more quickly, signaling overheads are reduced, or resources of the first access network device are saved. This can avoid unexpected disconnection of the first RRC connection during RRC connection handover, and ensure user experience.

With reference to the third aspect, in some implementations of the third aspect, the auxiliary information includes at least one of the following information: a reason for establishing or resuming the second RRC connection, a type of the second RRC connection, service type information or service priority information of the second RRC connection, expected duration of the second RRC connection, and capability information indicating whether the terminal device supports deactivation of the first RRC connection.

With reference to the third aspect, in some implementations of the third aspect, the reason for establishing or resuming the second RRC connection includes: The terminal device receives, with the second subscriber identity, a paging message sent by a camped cell, uplink data belonging to the second subscriber identity arrives, or the terminal device needs to send signaling with the second subscriber identity.

With reference to the third aspect, in some implementations of the third aspect, the type of the second RRC connection includes a signaling sending connection and a data transmission connection.

According to the solution in this embodiment of this application, the first access network device can determine, based on the type of the second RRC connection, to deactivate or release the first RRC connection, so that the first RRC connection is resumed more quickly, signaling overheads are reduced, or resources of the first access network device are saved. This can avoid unexpected disconnection of the first RRC connection, and ensure user experience. For example, a type of the second RRC connection is a signaling-only type, which is time-saving for a connection. An access network device may determine to deactivate the first RRC connection, so that the first RRC connection may be resumed within a very short period of time using a resume process. Compared with a delay and signaling overheads for re-establishing the first RRC connection, this has a shorter delay and smaller signaling overheads.

With reference to the third aspect, in some implementations of the third aspect, the method further includes: after the first RRC connection is released or deactivated, determining, based on the auxiliary information, whether to initiate paging for the first subscriber identity.

According to the solution in this embodiment of this application, the first access network device can determine, based on the auxiliary information, whether to initiate paging after the first RRC connection is released or deactivated. Even if downlink data arrives at the first access network device and a second access network device in turn, the paging message is not directly sent to trigger RRC connection handover, so that ping-pong handover between RRC connections can be avoided.

With reference to the third aspect, in some implementations of the third aspect, the second message includes delay indication information, where the delay indication information is used to indicate to delay releasing the first RRC connection or to delay deactivating the first RRC connection.

According to the solution in this embodiment of this application, the first access network device sends the second message to indicate the terminal device to delay releasing the first RRC connection or delay deactivating the first RRC connection. This can ensure stability of data transmission in the first RRC connection, avoid unexpected interruption of data transmission, and ensure user experience.

With reference to the third aspect, in some implementations of the third aspect, the second message includes delay duration information, where the delay duration information is used to indicate duration of delaying releasing the first RRC connection or delaying deactivating the first RRC connection.

With reference to the third aspect, in some implementations of the third aspect, the method further includes: continuing to perform data transmission with the terminal device within the delay duration.

According to the solution in this embodiment of this application, the first access network device sends the second message to notify the terminal device of the delay duration information, so that the terminal device may determine, based on the delay duration information, to release or deactivate the first RRC connection after the delay duration. For example, the delay duration may be delay duration determined by the first access network device based on current data transmission or the like. Releasing or deactivating the first RRC connection after the delay duration can further ensure stability of data transmission of the first RRC connection, avoid unexpected interruption of the data transmission, and ensure user experience.

With reference to the third aspect, in some implementations of the third aspect, the second message includes return indication information, where the return indication information is used to indicate the terminal device to trigger to establish or resume the first RRC connection after the second RRC connection is released or deactivated.

According to the solution in this embodiment of this application, the first access network device indicates the terminal device to return to the first RRC connection after the second RRC connection is released or deactivated, so that the terminal device may trigger, based on the return indication information, to establish or resume the first RRC connection after the second RRC connection is released or deactivated. Therefore, the data transmission of the first RRC connection continues as soon as possible after data transmission of the second RRC connection is completed. This ensures timeliness of the second RRC connection, and also ensures the data transmission of the first RRC connection.

With reference to the third aspect, in some implementations of the third aspect, the second message includes return duration information, where the return duration information is used to indicate the terminal device to establish or resume the first RRC connection within the return duration.

According to the solution in this embodiment of this application, the first access network device indicates the terminal device to establish or resume the first RRC connection within the return duration, so that the data transmission of the first RRC connection can continue as soon as possible. This ensures the timeliness of the second RRC connection, and further ensures the data transmission of the first RRC connection.

With reference to the third aspect, in some implementations of the third aspect, if it is determined to release the first RRC connection, information about a context release request is sent to a serving core network device.

With reference to the third aspect, in some implementations of the third aspect, the information about the context release request includes at least a part of the auxiliary information.

According to a fourth aspect, a wireless communication method is provided. The method includes: establishing or resuming a second RRC connection to a terminal device, and receiving first indication information from the terminal device, where the first indication information is used to indicate accelerating release or deactivation of the second RRC connection.

According to the solution in this embodiment of this application, a second access network device may determine, based on the first indication information, to release or deactivate the second RRC connection as soon as possible, so that the terminal device can return to a first RRC connection as soon as possible.

With reference to the fourth aspect, in some implementations of the fourth aspect, the first indication information includes first duration information. The first duration information is used to indicate maximum duration in which the second RRC connection can be maintained, or is used to indicate the terminal device that the first RRC connection needs to be established or resumed within duration indicated by the first duration information.

According to the solution in this embodiment of this application, the second access network device can determine, based on the first indication information, to release or deactivate the second RRC connection within the duration indicated by the first duration information, so that the terminal device can return to the first RRC connection as soon as possible.

With reference to the fourth aspect, in some implementations of the fourth aspect, the first indication information includes second indication information, where the second indication information is used to indicate a status of the first RRC connection.

According to the solution in this embodiment of this application, the second access network device can determine, based on the status of the first RRC connection, to release or deactivate the second RRC connection as soon as possible, so that the terminal device can return to the first RRC connection as soon as possible.

With reference to the fourth aspect, in some implementations of the fourth aspect, the first indication information is carried in a second RRC setup complete message or a second RRC resume complete message.

According to the solution in this embodiment of this application, the second RRC setup complete message or the second RRC resume complete message carries indication information.

According to a fifth aspect, a communication apparatus is provided. The communication apparatus is configured to perform the method in the first aspect or the second aspect. Specifically, the communication apparatus may include modules configured to perform the method in the first aspect or the second aspect. For example, the communication apparatus includes a sending module and a receiving module. For example, the communication apparatus is a communication device, or a chip or another component disposed in the communication device. For example, the communication device is a terminal device. The following uses an example in which the communication apparatus is a terminal device. The terminal device supports a first subscriber identity and a second subscriber identity.

The sending module is configured to send, with the first subscriber identity, a first message to a first access network device, where the first message is used to request to establish or resume a second RRC connection with the second subscriber identity. The first message includes auxiliary information, where the auxiliary information is used to indicate the first access network device to determine to release or deactivate a first RRC connection. The first RRC connection is a connection established with the first subscriber identity, and the second RRC connection is a connection established with the second subscriber identity.

The receiving module is configured to receive, with the first subscriber identity, a second message from the first access network device, where the second message is used to indicate to release or deactivate the first RRC connection. The terminal device is in an RRC connected state with the first subscriber identity, and is in an RRC idle state or an RRC deactivated state with the second subscriber identity.

Optionally, the sending module and the receiving module are integrated into one module, for example, a transceiver module.

The auxiliary information includes at least one of the following information: a reason for establishing or resuming the second RRC connection, a type of the second RRC connection, service type information or service priority information of the second RRC connection, expected duration of the second RRC connection, and capability information indicating whether the terminal device supports deactivation of the first RRC connection.

It should be understood that the method in the first aspect may be specifically the method in any one of the first aspect or the implementations of the first aspect, and the method in the second aspect may be specifically the method in any one of the second aspect or the implementations of the second aspect.

According to a sixth aspect, a communication apparatus is provided. The communication apparatus is configured to perform the method in the third aspect or the fourth aspect. Specifically, the communication apparatus may include modules configured to perform the method in the third aspect or the fourth aspect. For example, the communication apparatus includes a sending module, a receiving module, and a processing module. For example, the communication apparatus is a communication device, or a chip or another component disposed in the communication device. For example, the communication device is a terminal device. The following uses an example in which the communication apparatus is a first access network device.

The receiving module is configured to receive a first message from a terminal device, where the first message is used to request to establish or resume a second RRC connection with a second subscriber identity, the first message includes auxiliary information, the auxiliary information is used to indicate the first access network device to determine to release or deactivate a first RRC connection, the first RRC connection is a connection established by the terminal device with a first subscriber identity, the second RRC connection is a connection established by the terminal device with the second subscriber identity, and the terminal device is in an RRC connected state with the first subscriber identity, and is in an RRC idle state or an RRC deactivated state with the second subscriber identity.

The processing module is configured to determine, based on the auxiliary information, to release or deactivate the first RRC connection.

The sending module is configured to send a second message to the terminal device, where the second message is used to indicate to release or deactivate the first RRC connection.

Optionally, the sending module and the receiving module are integrated into one module, for example, a transceiver module.

The auxiliary information includes at least one of the following information: a reason for establishing or resuming the second RRC connection, a type of the second RRC connection, service type information or service priority information of the second RRC connection, expected duration of the second RRC connection, and capability information indicating whether the terminal device supports deactivation of the first RRC connection.

It should be understood that the method in the third aspect may be specifically the method in any one of the third aspect or the implementations of the third aspect, and the method in the fourth aspect may be specifically the method in any one of the fourth aspect or the implementations of the fourth aspect.

According to a seventh aspect, a communication apparatus is provided. For example, the communication apparatus is a chip disposed in a communication device. For example, the communication device is a terminal device. The communication apparatus includes: a communication interface, configured to receive and send information, in other words, configured to communicate with another apparatus, and a processor, where the processor is coupled to the communication interface. Optionally, the communication apparatus may further include a memory, configured to store computer-executable program code. Alternatively, the communication apparatus may not include a memory, and the memory may be located outside the communication apparatus. The program code stored in the memory includes instructions. When the processor executes the instructions, the communication apparatus is enabled to perform the method in the first aspect or the second aspect.

If the communication apparatus is a communication device, the communication interface may be a transceiver in the communication apparatus. For example, the communication interface is implemented by using an antenna, a feeder, a codec, or the like in the communication apparatus. Alternatively, if the communication apparatus is a chip disposed in a communication device, the communication interface may be an input/output interface of the chip, for example, an input/output pin.

It should be understood that the method in the first aspect may be specifically the method in any one of the first aspect or the implementations of the first aspect, and the method in the second aspect may be specifically the method in any one of the second aspect or the implementations of the second aspect.

According to an eighth aspect, a communication apparatus is provided. For example, the communication apparatus is a chip disposed in a communication device. For example, the communication device is an access network device. The communication apparatus includes: a communication interface, configured to receive and send information, in other words, configured to communicate with another apparatus, and a processor, where the processor is coupled to the communication interface. Optionally, the communication apparatus may further include a memory, configured to store computer-executable program code. Alternatively, the communication apparatus may not include a memory, and the memory may be located outside the communication apparatus. The program code stored in the memory includes instructions. When the processor executes the instructions, the communication apparatus is enabled to perform the method in the third aspect or the fourth aspect.

If the communication apparatus is a communication device, the communication interface may be a transceiver in the communication apparatus. For example, the communication interface is implemented by using an antenna, a feeder, a codec, or the like in the communication apparatus. Alternatively, if the communication apparatus is a chip disposed in a communication device, the communication interface may be an input/output interface of the chip, for example, an input/output pin.

It should be understood that the method in the third aspect may be specifically the method in any one of the third aspect or the implementations of the third aspect, and the method in the fourth aspect may be specifically the method in any one of the fourth aspect or the implementations of the fourth aspect.

According to a ninth aspect, a computer program product is provided. The computer program product includes computer program code. When the computer program code is run on a computer, the computer is enabled to perform the method performed by the terminal device in the foregoing aspects.

According to a tenth aspect, a computer program product is provided. The computer program product includes computer program code. When the computer program code is run on a computer, the computer is enabled to perform the method performed by the access network device in the foregoing aspects.

According to an eleventh aspect, a chip system is provided. The chip system includes a processor, configured to implement functions of the terminal device in the method in the foregoing aspects, for example, receiving or processing data and/or information in the foregoing method. In a possible design, the chip system further includes a memory. The memory is configured to store program instructions and/or data. The chip system may include a chip, or may include a chip and another discrete component.

According to a twelfth aspect, a chip system is provided. The chip system includes a processor, configured to implement functions of the access network device in the method in the foregoing aspects, for example, receiving or processing data and/or information in the foregoing method. In a possible design, the chip system further includes a memory. The memory is configured to store program instructions and/or data. The chip system may include a chip, or may include a chip and another discrete component.

According to a thirteenth aspect, a computer-readable storage medium is provided. The computer-readable storage medium stores a computer program. When the computer program is run, the method performed by the terminal device in the foregoing aspects is implemented.

According to a fourteenth aspect, a computer-readable storage medium is provided. The computer-readable storage medium stores a computer program. When the computer program is run, the method performed by the access network device in the foregoing aspects is implemented.

DETAILED DESCRIPTION OF ILLUSTRATIVE EMBODIMENTS

Figure 1:
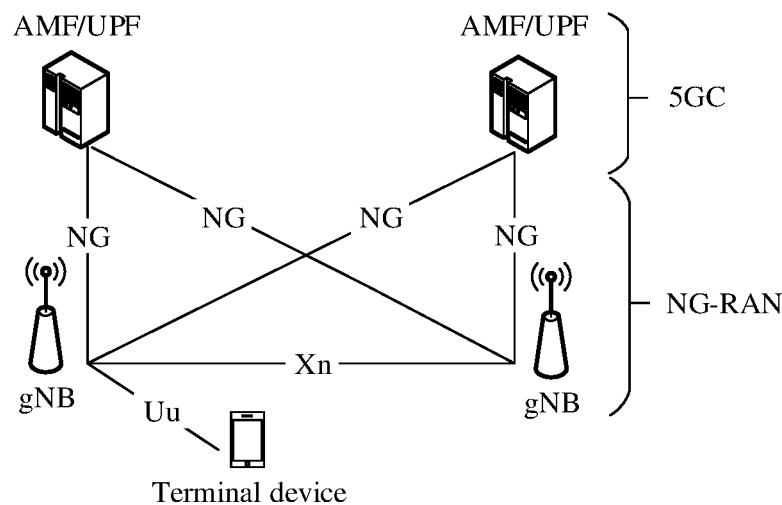
FIG. 1 is a schematic diagram of an architecture of a communication system according to an embodiment of this application.

The following describes the technical solutions in this application with reference to the accompanying drawings.

The technical solutions in embodiments of this application may be applied to various communication systems such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future fifth generation (5th generation, 5G) system, a new radio (NR) system or an enhanced or evolved system of the fifth generation system, vehicle-to-X (V2X), long term evolution-vehicle (LTE-V), Internet of vehicles, machine type communication (MTC), Internet of things (IoT), long term evolution-machine (LTE-M), and machine to machine (M2M). V2X may include vehicle to network (V2N), vehicle to vehicle (V2V), vehicle to infrastructure (V2I), vehicle to pedestrian (V2P), and the like.

The terminal device in embodiments of this application may include user equipment (UE), an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data connectivity for users, for example, a handheld device or a vehicle-mounted device that has a wireless connection function. Currently, for example, a terminal may be a mobile phone, a tablet computer (pad), a laptop computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved public land mobile network (PLMN), and/or any other suitable device configured to perform communication in a wireless communication system. This is not limited in embodiments of this application.

The wearable device, also be referred to as a wearable intelligent device, is an umbrella term for wearable devices such as glasses, gloves, watches, clothes, and shoes that are developed by applying wearable technologies to intelligent designs of daily wear. The wearable device is a portable device that can be directly worn on the body or integrated into clothes or an accessory of a user. The wearable device is more than a hardware device. The wearable device implements powerful functions through software support, data exchange, and cloud interaction. Wearable intelligent devices in a broad sense include full-featured and large-size devices capable of implementing complete or partial functions without depending on smartphones, such as smart watches or smart glasses, and devices dedicated to only one type of application function and collaborating with smartphones or other devices, such as various smart bands or smart jewelry for monitoring physical signs.

In addition, the terminal device in embodiments of this application may alternatively be a terminal device in an Internet of Things (IoT) system. IoT is an important part of future development of information technologies. A main technical feature of the IoT is connecting things to networks using communication technologies, to implement an intelligent network for interconnection between persons and machines, and between things.

In addition, in this application, the terminal device may further include a sensor, for example, an intelligent printer, a train detector, or a gas station. Main functions of the terminal device include: collecting data (for some terminal devices), receiving control information and downlink data of an access network device, sending electromagnetic waves, and transmitting uplink data to the access network device.

The access network device in embodiments of this application may be any device that has a wireless transceiver function for communication with the terminal device. The access network device may be a base transceiver station (BTS) in a global system for mobile communications (GSM) or a code division multiple access (CDMA) system, a NodeB (NB) in a wideband code division multiple access (WCDMA) system, an evolved NodeB (eNB or eNodeB) in an LTE system, a radio controller in a cloud radio access network (CRAN) scenario, a radio network controller (RNC), a base station controller (BSC), a home base station (for example, a home evolved NodeB, a home NodeB, HNB), or a baseband unit (BBU). Alternatively, the access network device may be a relay station, an access point, a vehicle-mounted device, a wearable device, an access network device in a future 5G network, an access network device in a future evolved PLMN network, or the like. Alternatively, the access network device may be an access point (AP), a wireless relay node, a wireless backhaul node, a transmission point (TP), a transmission and reception point (transmission and reception point, TRP), or the like in a WLAN, may be a gNB or a transmission point (TRP or TP) in a new radio (new radio, NR) system, or one or a group of antenna panels (including a plurality of antenna panels) of a base station in a 5G system. Alternatively, the access network device may be a network node that constitutes a gNB or a transmission point, for example, a baseband unit (BBU) or a distributed unit (distributed unit, DU). This is not limited in embodiments of this application.

In some deployments, the gNB may include a centralized unit (CU) and a DU. The gNB may further include an active antenna unit (AAU). The CU implements some functions of the gNB, and the DU implements some other functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the access network device may be a device including one or more of a CU node, a DU node, and an AAU node. In addition, the CU may be an access network device in an access network (RAN), or may be an access network device in a core network (CN). This is not limited in this application.

In addition, in embodiments of this application, the access network device provides a cell with services, and the terminal device communicates with the cell using transmission resources (for example, frequency domain resources or spectrum resources) allocated by the access network device. The cell may belong to a macro base station (for example, a macro eNB or a macro gNB), or may belong to a base station corresponding to a small cell. The small cell herein may include: a metro cell, a micro cell, a pico cell, a femto cell, and the like. The small cells are characterized by small coverage and a low transmit power, and are applicable to providing high-rate data transmission services.

In embodiments of this application, the terminal device or the access network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device, the access network device, or a function module that can invoke and execute the program and that is in the terminal device or the access network device.

In addition, aspects or features in embodiments of this application may be implemented as a method, an apparatus, or a product that uses standard programming and/or engineering technologies. The term "product" used in embodiments of this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to radio channels and various other media that can store, include, and/or carry instructions and/or data.

It should be noted that in embodiments of this application, a plurality of applications may be run at the application layer. In this case, an application for performing the communication method in embodiments of this application and an application configured to control a receive end device to implement an action corresponding to received data may be different applications.

At a given time, the access network device and the terminal device may be a wireless communication sending apparatus and/or a wireless communication receiving apparatus. When sending data, the wireless communication sending apparatus may encode data for transmission. Specifically, the wireless communication sending apparatus may obtain (for example, generate, receive from another communication apparatus, or store in a memory) a specific quantity of data bits to be sent on a channel to the wireless communication receiving apparatus. The data bits may be included in a transport block (or a plurality of transport blocks) of the data, and the transport block may be segmented to generate a plurality of code blocks.

FIG. 1 is a schematic diagram of a network architecture according to an embodiment of this application. As shown in FIG. 1, the communication system in embodiments of this application may include a 5G core network (5GC), a radio access network (NG-RAN), and a terminal device. gNBs are connected through an Xn interface. The gNB is connected to an access and mobility management function (AMF)/user plane function (UPF) through an NG interface. The gNB is connected to the terminal device through a Uu interface. The foregoing network architecture is merely an example, and is not a limitation of this application.

In embodiments of this application, "subscriber identity" (for example, a first subscriber identity or a second subscriber identity) is a logical concept. For example, "subscriber identity" may correspond to a subscriber identity module (SIM) card, subscriber information, a virtual SIM card, or a subscriber identity (for example, an international mobile subscriber identity (IMSI) or a temporary mobile subscriber identity (TMSI)). From the perspective of a network side, different "subscriber identities" logically correspond to different communication entities served by the network side, for example, UEs in 4G and 5G systems. For example, a terminal device supporting two subscriber identities may be considered as two communication entities for the network side. For another example, when "subscriber identity" corresponds to SIM card or subscriber information, the network side may identify a terminal device supporting a plurality of different SIM cards or a plurality of pieces of subscriber information as a plurality of different communication entities, even though the terminal device supporting a plurality of different SIM cards or a plurality of pieces of subscriber information is actually only one physical entity. It should be noted that, to distinguish between a communication entity and a physical entity, in embodiments of this application, an example in which UE is used as a communication entity and a terminal device is used as a physical entity is used for description. This should not be considered as a limitation of this application. Embodiments of this application are mainly described by using an example in which a "subscriber identity" corresponds to a SIM card.

For example, the SIM card may be understood as a key for the terminal device to access a mobile network. For ease of description, in embodiments of this application, the SIM card and evolution thereof are collectively referred to as a SIM card. For example, the SIM card may be an identity card of a digital mobile phone user of a global system for mobile communications (GSM). The SIM card is configured to store an identification number and a secret key of the user, and support authentication for a user by the GSM system. For another example, the SIM card may be a universal subscriber identity module (USIM) card, and may be referred to as an upgraded SIM card. For still another example, the SIM card may be another form that can identify a subscriber identity, such as a universal integrated circuit card (universal integrated circuit card, UICC), an embedded-SIM card (eSIM), or a soft SIM card. In embodiments of this application, a SIM card is used as an example for description. This does not constitute a limitation on this application.

In addition, it should be noted that "a terminal device of a first subscriber identity" in embodiments of this application may be understood as "a first subscriber identity of a terminal device". The two description manners convey a same meaning and are interchangeable. Similarly, "a terminal device of a second subscriber identity" may be understood as "a second subscriber identity of a terminal device". The two description manners convey a same meaning and are interchangeable.

RRC statuses of UE include the following types.

RRC connected state is a state in which an RRC connection is established between UE and a network for data transmission.

RRC idle state is a state in which no RRC connection is established between UE and a network, and a base station does not store a context of the UE.

RRC deactivated (inactive) state is a state in which UE has entered an RRC connected state previously and then a base station releases the RRC connection, but the base station and the UE save a context. If the UE needs to enter the RRC connected state from the RRC deactivated state, an RRC connection resume process needs to be initiated. Compared with an RRC setup process, the RRC resume process has a shorter delay and smaller signaling overheads, but more storage overheads are occupied as the base station side needs to store the context of the UE.

Figure 2:
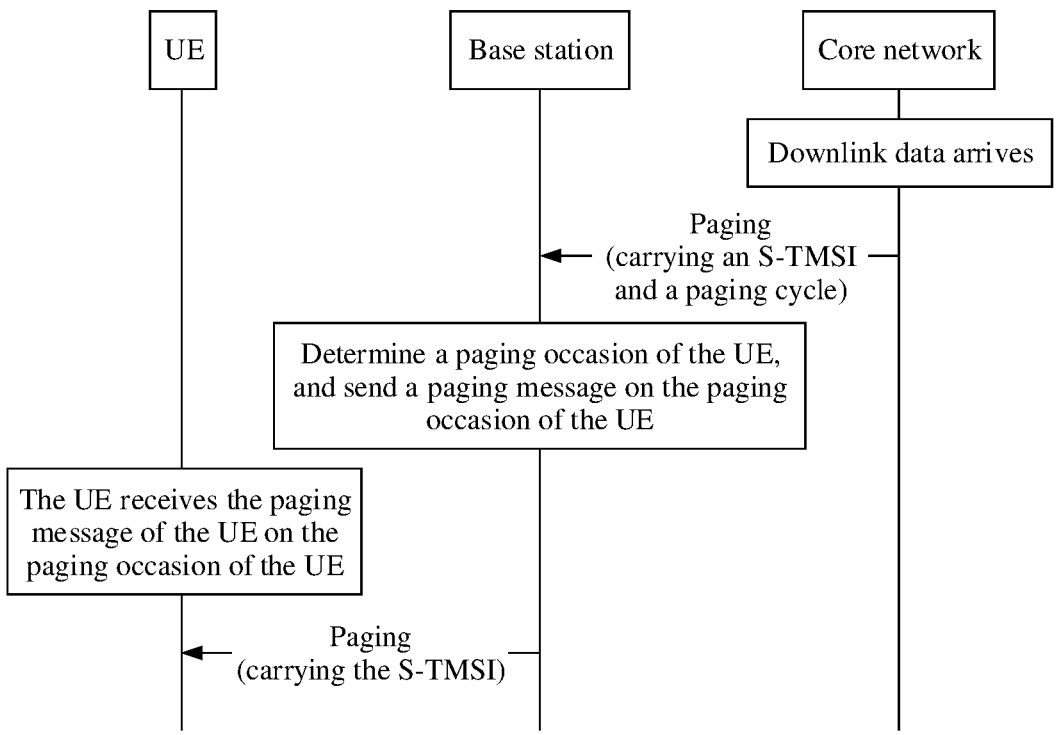
FIG. 2 is a schematic diagram of a paging process in a communication system.

When the UE does not perform data transmission, the UE enters the RRC idle state or the RRC deactivated state for power saving. In the two states, paging supports discontinuous reception (DRX). The UE needs to wake up at a specific location with a specific cycle to monitor whether the network pages the UE. FIG. 2 is a schematic diagram of a process of paging UE in an RRC idle state. For the UE in the RRC idle state, when downlink data arrives at a core network device (that is, when a network needs to send data to the UE), the core network device sends a paging message to a base station, where the paging message carries an S-temporary mobile subscriber identity (S-TMSI) and a paging cycle, to trigger the base station to send the paging message over an air interface. The base station determines a paging occasion of the UE, and sends the paging message over the air interface on the paging occasion of the UE. The paging message carries the S-TMSI. For the UE in the RRC deactivated state, when downlink data arrives at the base station, the base station triggers sending of a paging message. The base station determines a paging occasion of the UE, and sends the paging message over an air interface on the paging occasion of the UE. The paging message carries a UE paging identity (UE paging identity), for example, an I-radio network temporary identifier (I-radio network temporary identifier, I-RNTI). The UE monitors a physical downlink control channel (PDCCH) on the paging occasion of the UE to receive the paging message. After receiving the paging message and determining that the UE is paged, the UE initiates a new RRC connection establishment or resume process in a cell on which the UE camps to enter the RRC connected state.

Figures 3A, 3B, 3C:
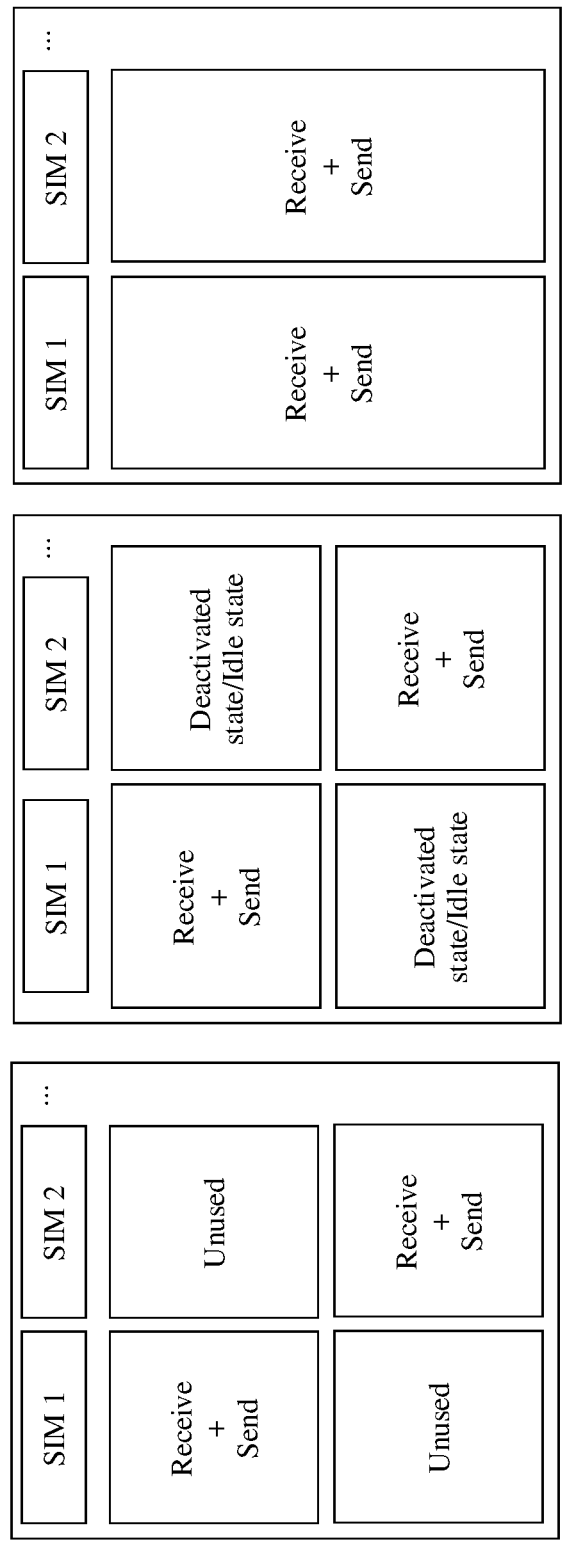
FIG. 3(*a*) to FIG. 3(*c*) are schematic diagrams of three types of dual-SIM terminal devices.

The following describes a terminal device that supports two subscriber identities, for example, a terminal device that supports two SIM cards. A base station of a SIM card may also be referred to as a base station corresponding to a subscriber identity of the terminal device, and this may be understood as that the base station serves a communication entity corresponding to the SIM. FIG. 3(a) to FIG. 3(c) are schematic diagrams of three types of terminal devices that support dual SIMs. Based on different transceiver capabilities of the terminal devices, there may be the following three modes of dual-SIM terminal devices.

FIG. 3(a) shows a passive mode in which only one SIM card can be used at a moment, that is, can be used for receiving (receive) and transmitting (transmit), and the other card is unused, although the two SIM cards can be inserted.

FIG. 3(b) shows a dual SIM dual standby mode in which two SIM cards share a set of transceivers, and a terminal device in an RRC idle state needs to monitor paging messages of the two cards, for example, in a time-division multiplexing (TDM) mode. When there is an RRC connection between the terminal device and a base station of one of the SIMs (for example, SIM 1), when the SIM 1 enters an RRC connected state, or when the SIM 1 enters the RRC connected state with a first subscriber identity, to send and receive data, the terminal device cannot maintain an RRC connection between the terminal device and a base station of the other SIM (for example, SIM 2), or the SIM 2 is in an RRC idle state or an RRC deactivated state, or the terminal device is in an RRC idle state or an RRC deactivated state with a second subscriber identity.

FIG. 3(c) shows a dual SIM dual active (DSDA) mode in which two SIM cards correspond to respective transceivers. The two SIM cards may be in an RRC connected state. In other words, the two SIM cards are in an RRC connected state at the same time with two subscriber identities, that is, the terminal device can receive and send data of the two SIM cards.

Figure 4:
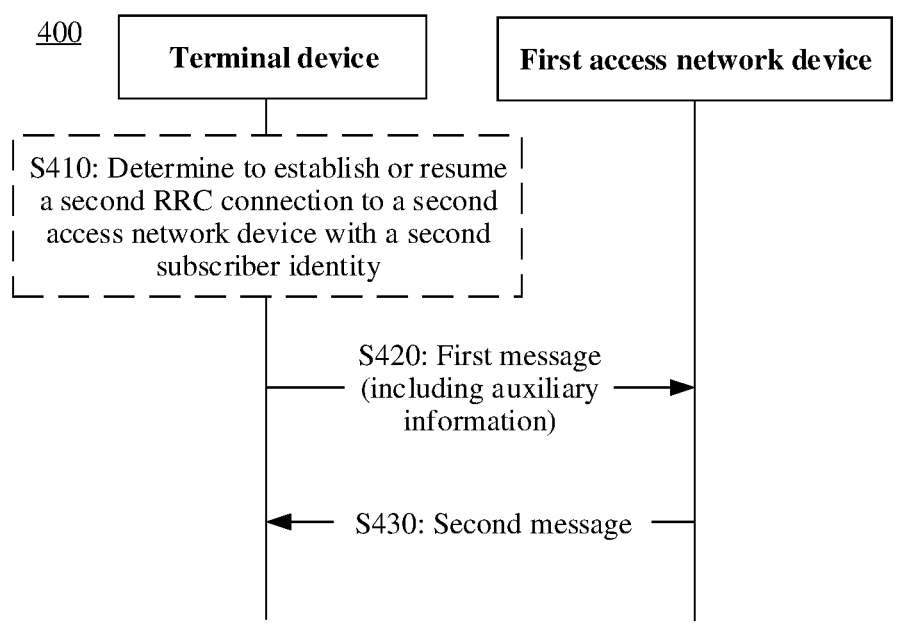
FIG. 4 is a schematic flowchart of a communication method according to an embodiment of this application.

FIG. 4 is a schematic diagram of a communication method 400 according to an embodiment of this application. In embodiments of this application, a terminal device supporting only two subscriber identities (for example, dual SIMs) is used for description. The communication method in embodiments of this application is further applicable to a terminal device supporting more than two subscriber identities (for example, more than two SIMs). The method 400 includes steps S410 to S430.

S410: A terminal device determines to establish or resume a second RRC connection, with a second subscriber identity, to a second access network device, where the terminal device is in an RRC connected state with a first subscriber identity, and the terminal device is in an RRC idle state or an RRC deactivated state with the second subscriber identity. Before S410, the terminal device has established a first RRC connection, with the first subscriber identity, to a first access network device. In this embodiment of this application, the first RRC connection is an RRC connection established by the terminal device with the first subscriber identity, and the second RRC connection is an RRC connection established by the terminal device with the second subscriber identity.

The first access network device is an access network device to which a serving cell of the first subscriber identity of the terminal device belongs, where the terminal device establishes the first RRC connection, with the first subscriber identity, to the first access network device. When the terminal device is in an RRC idle state or an RRC deactivated state with the first subscriber identity, the terminal device still camps on the serving cell of the first access network device.

The second access network device is an access network device to which a serving cell of the second subscriber identity of the terminal device belongs, where the terminal device establishes the second RRC connection, with the second subscriber identity, to the second access network device. When the terminal device is in the RRC idle state or the RRC deactivated state with the second subscriber identity, the terminal device still camps on the serving cell of the second access network device.

It should be noted that, in the communication method provided in this embodiment of this application, the first access network device and the second access network device may be a same device or may be different devices.

As an example instead of a limitation, when the terminal device needs to enter the RRC connected state with the second subscriber identity, the terminal device may determine whether to enter the connected state with the second subscriber identity, that is, determine whether to establish or resume the second RRC connection with the second subscriber identity. For example, the terminal device may determine, based on information such as a service priority of the second RRC connection, whether to establish or resume the second RRC connection. For another example, the terminal device receives, with the second subscriber identity, a paging message sent by a camped cell, where the paging message carries information about duration in which the second RRC connection needs to be maintained, and the terminal device may determine, based on the information about the duration, whether to respond to the second subscriber identity. If determining to respond to the second subscriber identity, the terminal device performs S420.

Alternatively, when the terminal device needs to enter the RRC connected state with the second subscriber identity, the terminal device directly performs S420. That is, when the terminal device needs to enter the RRC connected state with the second subscriber identity, the terminal device directly responds to the second subscriber identity without determining, and determines to establish or resume the second RRC connection.

It should be noted that S410 is an optional step.

S420: The terminal device sends a first message, with the first subscriber identity, to the first access network device, where the first message is used to request to establish or resume the second RRC connection with the second subscriber identity, or is used to request to release or deactivate the first RRC connection. The first message may include auxiliary information. The auxiliary information is used to indicate the first access network device to determine whether to release or deactivate the first RRC connection. The first RRC connection is a connection established by the terminal device with the first subscriber identity.

Specifically, for example, the first subscriber identity corresponds to a first SIM card, and that the terminal device sends a first message, with the first subscriber identity, to the first access network device may be that the terminal device sends the first message, with the first SIM card, to the first access network device.

When the terminal device does not establish the second RRC connection, with the second subscriber identity, to the second access network device, and the terminal device is currently in the RRC idle state with the second subscriber identity and needs to enter the RRC connected state from the RRC idle state with the second subscriber identity, the terminal device needs to establish the second RRC connection with the second subscriber identity. In this case, the first message may be used to request to establish the second RRC connection with the second subscriber identity.

When the terminal device has previously established the second RRC connection, with the second subscriber identity, to the second access network device, and the terminal device is currently in the RRC deactivated state with the second subscriber identity and needs to enter the RRC connected state from the RRC deactivated state with the second subscriber identity, the terminal device needs to resume the second RRC connection with the second subscriber identity. In this case, the first message may be used to request to resume the second RRC connection with the second subscriber identity.

"Deactivating an RRC connection" in embodiments of this application may also be understood as suspending an RRC connection.

The first message may be used to notify the first access network device that the terminal device needs to be handed over to the second RRC connection. As an example instead of a limitation, the requesting to establish or resume the second RRC connection with the second subscriber identity may be requesting to release or deactivate the first RRC connection. For example, the terminal device may send a first message used for "requesting to establish or resume the second RRC connection with the second subscriber identity", and the first access network device may release or deactivate the first RRC connection based on the first message. For another example, the terminal device may send a first message used for "requesting to release the first RRC connection", a first message used for "requesting to deactivate the first RRC connection", or a first message used for "requesting to release or deactivate the first RRC connection". The first access network device may release or deactivate the first RRC connection based on the first message.

Releasing the first RRC connection may also be expressed as: The terminal device enters the RRC idle state with the first subscriber identity. Deactivating the first RRC connection may also be expressed as: The terminal device enters the RRC deactivated state with the first subscriber identity.

It should be noted that the first message may include a plurality of messages, where at least one of the messages is used to request to establish or resume the second RRC connection with the second subscriber identity, and at least one of the messages includes the auxiliary information. The two messages may be a same message, or may be different messages.

The auxiliary information includes at least one of the following information: a reason for establishing or resuming the second RRC connection, a type of the second RRC connection, expected duration of the second RRC connection, and capability information indicating whether the terminal device supports deactivation of the first RRC connection.

The following describes the auxiliary information in detail.

A(1) Reason for establishing or resuming the second RRC connection: For example, the reason for establishing or resuming the second RRC connection may be that the terminal device receives, with the second subscriber identity, the paging message sent by the camped cell, that uplink data of the second subscriber identity of the terminal device arrives, or that the terminal device needs to send signaling with the second subscriber identity, for example, signaling in a periodic registration process or a radio access network (RAN) notification area (RAN-based notification area, RNA) update (update) process.

Specifically, the cause value of the second RRC connection establishment or resume may be an establishment cause value (EstablishmentCause) in a second RRC connection setup request (RRCSetupRequest) message initiated by the terminal device, or a resume cause value (ResumeCause) in a second RRC connection resume request (RRCResumeRequest) message initiated by the terminal device. As an example instead of a limitation, the cause value may include the following values.

emergency: dial an emergency number
HighPriorityAccess: high-priority access
mt-access: called access
mo-Signalling: when signaling is sent
mo-Data: when data is sent
mo-VoiceCall: voice call
mo-VideoCall: video call
DelayTolerantAccess: delay-tolerant access
mo-SMS: short message service For example, a cause value corresponding to a received paging message sent by the camped cell may be "mt-access". A cause value corresponding to uplink data arrival may be "mo-Data". A cause value corresponding to sending a signaling message to a network may be "mo-Signalling".

A(2) Service type or service priority of the second RRC connection: For example, there are the following service types: enhanced mobile broadband (eMBB) services, ultra-reliable low-latency communication (URLLC) services, and the like.

A(3) Type of the second RRC connection: For example, the second RRC connection may be a signaling-only connection, or a data transmission connection. For example, a second RRC connection for which a periodic registration process is initiated with the second subscriber identity or for which an RNA update process needs to be performed with the second subscriber identity in the RRC deactivated state is a signalling-only connection.

A(4) Expected duration of the second RRC connection: For example, the expected duration may be estimated duration or maximum duration of the second RRC connection, or duration in which the terminal device is not in the first RRC connection.

A(5) Capability information indicating whether the terminal device supports deactivation of the first RRC connection, that is, information indicates whether the terminal device supporting two subscriber identities supports "maintaining one RRC connection and deactivating the other RRC connection."

As an example instead of a limitation, the capability information indicating whether the terminal device supports deactivation of the first RRC connection may not be carried in the first message, but is carried in an RRC access stratum capability and sent to the access network device, that is, the capability is included in the RRC access stratum capability. For details about obtaining RRC access stratum capability by the access network device, refer to the existing mechanisms. Details are not described herein again.

S430: The first access network device sends a second message to the terminal device, where the second message is used to indicate the terminal device to release or deactivate the first RRC connection. The terminal device receives the second message with the first subscriber identity.

The terminal device may release or deactivate the first RRC connection based on the second message.

The first access network device may determine, based on the auxiliary information, to release or deactivate the first RRC connection. The following provides a specific determining manner as an example instead of a limitation.

For example, the auxiliary information includes a type of the second RRC connection. If the type of the second RRC connection is a signalling-only connection, because time consumed for the signalling-only connection is short, the first access network device may determine to deactivate the first RRC connection. Therefore, the first RRC connection can be resumed after a very short period of time using a resume process. Compared with a delay and signaling overheads for re-establishing the first RRC connection, this has a shorter delay and smaller signaling overheads.

For another example, the auxiliary information includes expected duration of the second RRC connection. If the expected duration of the second RRC connection is very short, for example, the expected duration is less than or equal to a specified threshold, the first access network device may determine to deactivate the first RRC connection, so that the first RRC connection can be resumed after a very short period of time using a resume process. Compared with a delay and signaling overheads for re-establishing the first RRC connection, this has a shorter delay and smaller signaling overheads. If the expected duration is very long, for example, the expected duration is greater than a specified threshold, the first access network device may determine to release the first RRC connection, thereby saving resources of the first access network device, for example, memory resources of the first access network device.

For another example, the auxiliary information includes capability information indicating whether the terminal device supports deactivation of the first RRC connection. If the terminal device does not support a capability of deactivating the first RRC connection, the first access network device may determine to release the first RRC connection, otherwise, the first access network device may determine, based on other auxiliary information, whether to release or deactivate the first RRC connection.

As an example instead of a limitation, the first access network device may alternatively reject a request of the terminal device based on the auxiliary information, that is, continue to maintain the first RRC connection. In this case, the second message may be a reject message, which carries a specific reject cause value.

For example, the first access network device may determine, based on "cause value for establishing or resuming the second RRC connection" or "service priority of the second RRC connection" in the auxiliary information, that a priority of the first RRC connection is higher, reject the request of the terminal device, and continue to maintain the first RRC connection.

As an example instead of a limitation, the second message may include delay indication information, where the delay indication information is used to indicate the terminal device to delay releasing the first RRC connection or delay deactivating the first RRC connection.

The terminal device may delay releasing the first RRC connection or delay deactivating the first RRC connection based on the delay indication information.

As an example instead of a limitation, the second message may include delay duration information, where the delay duration information is used to indicate duration of delaying releasing the first RRC connection or delaying deactivating the first RRC connection.

The terminal device may determine, based on the delay duration information, the duration of delaying releasing the first RRC connection or delaying deactivating the first RRC connection.

Further, the delay duration information may be used to indicate the terminal device to release or deactivate the first RRC connection after a delay duration time interval. After receiving the second message, the terminal device releases or deactivates the first RRC connection after the delay duration time interval.

Alternatively, the delay duration information may be used to indicate the terminal device to additionally wait for the delay duration time interval before releasing or deactivating the first RRC connection. After receiving the second message, the terminal device additionally waits for the delay duration time interval before releasing or deactivating the first RRC connection. In other words, a time interval between a moment at which the terminal device receives the second message and a moment at which the first RRC connection is released or deactivated is greater than the delay duration time interval. For example, if the second message does not include the delay duration information, after receiving the second message, the terminal device needs to release or deactivate the first RRC connection after delaying for preset time. In this case, if the second message includes the delay duration information, after receiving the second message, the terminal device waits for the preset time, and then waits for the delay duration time interval before releasing or deactivating the first RRC connection.

In this way, the terminal device can continue to perform data transmission with the first access network device within the delay duration, and release or deactivate the first RRC connection after the delay duration. It should be noted that the second message may include the delay indication information and the delay duration information. Alternatively, the second message may include the delay duration information but does not include the delay indication information. In other words, the terminal device may determine, based on the delay duration information, to delay releasing the first RRC connection or delay deactivating the first RRC connection.

For example, the first access network device still has downlink data of the current terminal device that has not been transmitted to the terminal device. The first access network device may determine to delay releasing the first RRC connection or delay deactivating the first RRC connection, and continue to transmit data to the terminal device within the delay duration. The terminal device may continue to perform data transmission with the first access network device within the delay duration. This can avoid unexpected interruption of data transmission in the first RRC connection, and further ensure user experience.

As an example instead of a limitation, the second message may include return indication information, where the return indication information is used to indicate the terminal device to trigger to establish or resume the first RRC connection after releasing or deactivating the second RRC connection. In this way, the terminal device may establish or resume the first RRC connection after releasing or deactivating the second RRC connection. In this way, data transmission of the first RRC connection continues as soon as possible after data transmission of the second RRC connection is completed. This ensures timeliness of the second RRC connection, ensures integrity of the data transmission of the first RRC connection as much as possible, and optimizes user experience.

As an example instead of a limitation, the second message may include return duration information, where the return duration information is used to indicate the terminal device to establish or resume the first RRC connection within the return duration. In this way, the terminal device may establish or resume the first RRC connection within the return duration. It should be noted that the second message may include the return indication information and the return duration information. Alternatively, the second message may include the return duration information but does not include the return indication information. In other words, the terminal device may determine, based on the return duration information, that the terminal device needs to return to the first RRC connection.

For example, the first access network device still has downlink data that has not been sent to the terminal device, or it is estimated that there is still downlink data that needs to be sent to the terminal device. The first access network device may indicate the terminal device to return to the first RRC connection after releasing or deactivating the second RRC connection. Alternatively, if the second message includes the return duration information, the first access network device may indicate the terminal device to return to the first RRC connection, that is, establish or resume the first RRC connection, when or before a timer for the return duration expires. In this way, data transmission of the first RRC connection can continue as soon as possible after data transmission of the second RRC connection is completed. This ensures timeliness of the second RRC connection, ensures integrity of the data transmission of the first RRC connection as much as possible, and optimizes user experience.

Optionally, the method 400 further includes S431. The second message indicates the terminal device to deactivate the first RRC connection, that is, the first access network device determines to deactivate the first RRC connection. When new downlink data arrives, the first access network device may determine, based on the auxiliary information, whether to initiate paging for the first subscriber identity. In this way, if downlink data arrives at the first access network device and the second access network device in turn, a paging message is not directly sent to trigger RRC connection handover. This can avoid ping-pong handover between RRC connections, and optimize user experience.

For example, the first access network device may determine, based on the reason for establishing or resuming the second RRC connection in the auxiliary information, whether to initiate paging for the first subscriber identity. When a service priority of new data is higher than the service priority of the second RRC connection in the auxiliary information, the first access network device may send a paging message for the first subscriber identity, to ensure timeliness of high-priority service transmission. Otherwise, the first access network device does not initiate paging for the first subscriber identity, to reduce a waste of paging resources. The reason is that the terminal device may decide to continue to maintain, if the new data has a low priority, the second RRC connection even if the terminal device receives the paging message for the first subscriber identity.

For another example, the first access network device may determine, based on the expected duration of the second RRC connection in the auxiliary information, whether to initiate paging for the first subscriber identity. If the first access network device receives new data of the terminal device within the expected duration of the second RRC connection, the first access network device may not page the terminal device unless the new service priority is higher than the service priority of the second RRC connection. This prevents ping-pong handover between RRC connections.

Optionally, the method 400 further includes S432: When the second message indicates to release the first RRC connection, the first access network device may send a terminal device context release request message to a core network device.

The core network device may send terminal device context release command (context release command) information to the first access network device.

As an example instead of a limitation, the context release request message may carry all or some of the auxiliary information (for example, the service type or the service priority of the second RRC connection, or the expected duration of the second RRC connection) reported by the terminal device.

Further, the core network device may determine, based on the auxiliary information, whether to send the paging message for the first subscriber identity when the downlink data arrives.

For example, if the service priority of the second RRC connection in the auxiliary information is higher than the service priority of the downlink data for the first subscriber identity, the core network device may determine not to send the paging message for the first subscriber identity, to reduce a waste of paging resources. The reason is that the terminal device may not respond to the paging for the first subscriber identity to return to the first RRC connection even if the paging message for the first subscriber identity is sent. For another example, if the expected duration of the second RRC connection does not expire, the core network device may determine not to send the paging message for the first subscriber identity, to avoid ping-pong handover between RRC connections. For another example, if the expected duration of the second RRC connection does not expire, but the service priority of the downlink data for the first subscriber identity is higher than the service priority of the second RRC connection, the core network device may determine to send the paging message for the first subscriber identity, to ensure timeliness of high-priority service transmission.

According to the solution in this embodiment of this application, the terminal device sends the first message including the auxiliary information to the access network device, to request to establish or resume the second RRC connection with the second subscriber identity. The access network device can determine, based on the auxiliary information, to release or deactivate the first RRC connection. This avoids unexpected interruption of data transmission, avoids ping-pong handover occurring when the terminal device establishes an RRC connection with a plurality of subscriber identities, and optimizes user experience. In addition, if the first access network device determines, based on the auxiliary information, to release the first RRC connection, this can save resources of the first access network device or reduce signaling overheads. If the first access network device determines, based on the auxiliary information, to deactivate the first RRC connection, the first RRC connection can be resumed more quickly.

Figure 5:
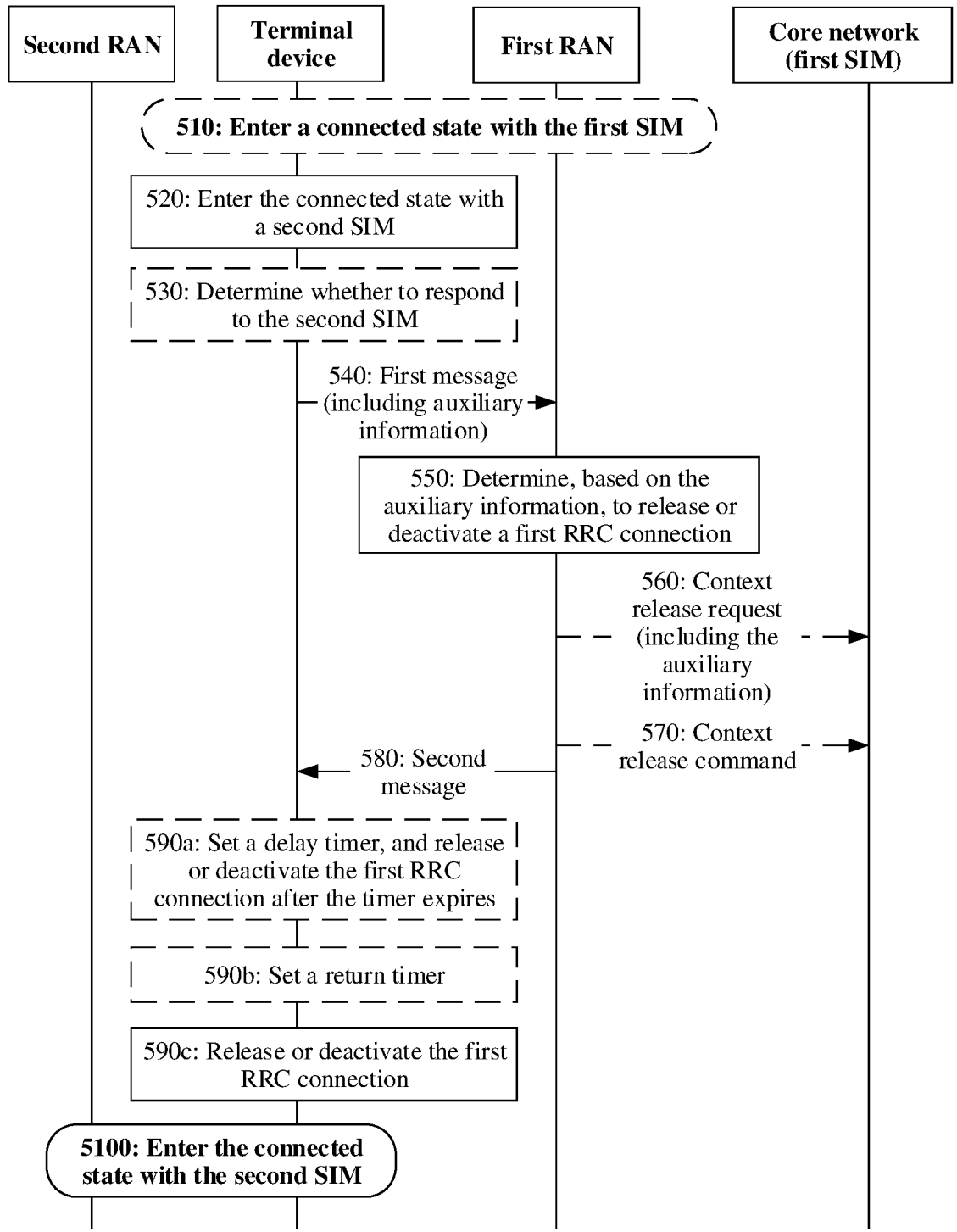
FIG. 5 is a schematic flowchart of a communication method according to another embodiment of this application.

FIG. 5 is a schematic diagram of a communication method 500 according to another embodiment of this application. The method 500 includes steps S510 to S5100.

S510: A first SIM (an example of a first subscriber identity) of a terminal device enters an RRC connected state, that is, the terminal device establishes or resumes a first RRC connection, with the first subscriber identity, to a first RAN (the first RAN is an example of a first access network device). S510 is an optional step.

S520: The terminal device determines to enter the RRC connected state with a second SIM (the second SIM is an example of a second subscriber identity), that is, the terminal device determines to establish or resume a second RRC connection, with the second subscriber identity, to a second RAN (the second RAN is an example of a second access network device). S520 is an optional step.

S530: The terminal device determines whether to enter the connected state with the second SIM, or whether to respond to a request for entering the connected state with the second SIM, that is, the terminal device determines whether to establish or resume the second RRC connection. For a manner of determining, refer to S410. Details are not described herein again. S530 is an optional step. Alternatively, after determining to enter the RRC connected state using the second SIM, the terminal device may directly perform S540.

S540: The terminal device sends a first message to the first access network device, for example, the first RAN in FIG. 5, where the first message may be used to request to establish or resume the second RRC connection with the second subscriber identity. The first message may include auxiliary information, where the auxiliary information is used by the first RAN to determine to release or deactivate the first RRC connection.

The first SIM is in the RRC connected state, that is, the terminal device is in the RRC connected state with the first subscriber identity. The second SIM is in an RRC idle state or an RRC deactivated state, that is, the terminal device is in the RRC idle state or the RRC deactivated state with the second subscriber identity.

For the auxiliary information, refer to related descriptions in S420. Details are not described herein again.

S550: The first RAN may determine, based on the auxiliary information, to deactivate or release the first RRC connection, or to reject the request. Rejecting the request means to continue to maintain the first RRC connection.

As an example instead of a limitation, the first RAN may determine, based on a "reason for the second RRC connection" or "service priority of the second RRC connection" in the auxiliary information that a service priority of the first RRC connection is higher, to reject the request.

As an example instead of a limitation, the first RAN may determine to delay deactivating the current connection or delay releasing the current connection.

As an example instead of a limitation, the first RAN may determine delay duration. For example, if the first RAN side still has downlink data of the current terminal device that has not been transmitted to the terminal device, the first RAN may determine the delay duration, and maximally transmit the data to the terminal device within the delay duration.

S560: The first RAN sends a context release request message of the terminal device to a serving core network device.

As an example instead of a limitation, optionally, the message may include all or some of the auxiliary information (for example, a service type or a service priority of the second RRC connection, or expected duration of the second RRC connection) reported by the terminal device.

S570: The core network device sends a context release command message of the terminal device to the first RAN.

As an example instead of a limitation, optionally, the core network device may determine, based on the auxiliary information, whether to send a paging message for the first SIM when the downlink data arrives. For example, if the service priority of the second RRC connection is higher than a service priority of the downlink data, the core network device may determine not to send the paging message for the first SIM. The reason is that the terminal device may not respond to the paging for the first SIM to return to the first RRC connection even if the paging message is sent for the first SIM. For another example, if the expected duration of the second RRC connection does not expire, the core network device may determine not to send the paging message for the first SIM, to avoid ping-pong handover between RRC connections. For another example, if the expected duration of the second RRC connection does not expire, but the service priority of the first RRC connection is higher than the service priority of the second RRC connection, the core network device may determine to send the paging message for the first SIM.

It should be noted that, if it is determined to release the first RRC connection in step S550, step S560 and step S570 are performed, or if it is determined to deactivate the first RRC connection or reject the request in step S550, step S560 and step S570 are not performed.

S580: The first RAN sends a second message to the terminal device, where the second message is used to indicate to deactivate the first RRC connection, release the first RRC connection, or reject the request (that is, maintain the first RRC connection). The first RAN may configure a specific RRC operation to be performed by the terminal device.

As an example instead of a limitation, the second message may include delay indication information and/or return indication information.

B(1) Delay indication message: For example, the delay indication message may be delay releasing indication information or delay deactivating indication information. The delay indication information is used to indicate to delay releasing the first RRC connection or to delay deactivating the first RRC connection.

For example, the second message may include delay duration information. The delay duration information is used to indicate to release or deactivate the first RRC connection after the delay duration.

B(2) Return indication information: The return indication information is used to indicate the terminal device to actively return to the first RRC connection after the second RRC connection is released or deactivated, that is, trigger to establish or resume the first RRC connection. For example, the first RAN still has downlink data that needs to be sent to the terminal device, or it is estimated that there is still downlink data that needs to be sent to the terminal device. In this case, the second message sent by the first RAN may include the return indication information.

For example, the second message may include return duration information. When or before a timer for the return duration expires, the terminal device needs to return to the first RRC connection.

S590, S590a, and S590b are optional steps. Specifically, if the second message in step S580 includes the delay indication information, step S590a is performed. If the return indication information is included in step S580, step S590b is performed.

S590a: Start a delay timer, where duration of the delay timer may be duration specified in a protocol. If the second message includes the delay duration information, the duration of the delay timer may be the delay duration. Data transmission continues to be performed with the first RAN before the delay timer expires. After the delay timer expires, step S590c is performed.

S590b: Start a return timer, where duration of the return timer may be duration specified in a protocol. If the second message includes the return duration information, the duration of the return timer may be the return duration. When the second RRC connection of the terminal device is released or deactivated when or before the return timer expires, the terminal device needs to return to the first RRC connection and initiate a process to establish or resume the first RRC connection.

S590c: Release or deactivate the first RRC connection based on the second message, that is, the first SIM enters the RRC idle state or the RRC deactivated state.

S5100: The terminal device establishes or resumes the second RRC connection, with the second subscriber identity, to the second RAN, that is, the second SIM enters the RRC connected state. If the second SIM is previously in the RRC idle state, a process of establishing the second RRC connection is initiated to the second RAN. If the second SIM is previously in the RRC deactivated state, a process of resuming the second RRC connection is initiated to the second RAN.

According to the solution in this embodiment of this application, the terminal device sends the first message including the auxiliary information to the access network device, to request to establish or resume the second RRC connection with the second subscriber identity. The access network device can determine, based on the auxiliary information, to release or deactivate the first RRC connection. This avoids unexpected interruption of data transmission, avoids ping-pong handover occurring when the terminal device establishes an RRC connection with a plurality of subscriber identities, and optimizes user experience. In addition, if the first access network device determines, based on the auxiliary information, to release the first RRC connection, this can save resources of the first access network device or reduce signaling overheads. If the first access network device determines, based on the auxiliary information, to deactivate the first RRC connection, the first RRC connection can be resumed more quickly.

The access network device usually triggers release or deactivation of an RRC connection over an air interface based on a user inactivity timer. To be specific, when no data is transmitted in a period of time, the access network device releases the RRC connection over the air interface, for power saving of the terminal device. In this embodiment of this application, the terminal device establishes the first RRC connection to the first access network device with the first subscriber identity. The first RRC connection is released or deactivated because the terminal device needs to enter the RRC connected state with the second subscriber identity, but there may be still service data to be transmitted through the first RRC connection. Therefore, the terminal device may send indication information to the second access network device, to indicate the second access network device to release or deactivate the second RRC connection more quickly, to resume the first RRC connection.

After releasing the first RRC connection or deactivating the first RRC connection, the terminal device establishes or resumes the second RRC connection, with the second subscriber identity, to the second access network device, and sends first indication information to the second access network device, where the first indication information is used to indicate the second access network device to accelerate release or deactivation of the second RRC connection.

The second access network device may accelerate the release or deactivation of the second RRC connection based on the first indication information.

For example, the first indication information may include second indication information, where the second indication information may be used to indicate a status of the first RRC connection. The status of the first RRC connection may be a status in which the first RRC connection is deactivated or released. For example, the second indication information may be information that the first RRC connection is deactivated or released (because the terminal device needs to enter the RRC connected state with the second subscriber identity). If the second indication information indicates that the first RRC connection is deactivated, the second access network device may learn, based on the second indication information, that the terminal device needs to return to the first RRC connection as soon as possible. Therefore, release or deactivation of the second RRC connection is accelerated.

For example, the first indication information may include information about that establishment or resume of the first RRC connection needs to be triggered after the second RRC connection is released or deactivated. That is, the second access network device may determine, based on the information that establishment or resume of the first RRC connection needs to be triggered after the second RRC connection is released or deactivated, to accelerate release or deactivation of the second RRC connection. Alternatively, the first indication information may include information that the terminal device is a terminal device supporting two subscriber identities (for example, the terminal device is a dual SIM dual standby terminal device). In other words, the second access network device may determine, based on the information that the terminal device is a terminal device supporting two subscriber identities, to accelerate release or deactivation of the second RRC connection.

For example, the first indication information may include information for indicating the second access network device to reduce duration of the user inactivity timer.

As an example instead of a limitation, the second access network device may determine to reduce the duration of the user inactivity timer based on the first indication information. For example, the duration of the user inactivity timer is 500 ms for a common terminal device. To be specific, if the common terminal device does not send data for 500 ms consecutively, the access network device releases or deactivates an RRC connection. However, the access network device may set shorter duration of the user inactivity timer for the terminal device supporting two subscriber identities. For example, the duration of the user inactivity timer may be 200 ms. That is, for the terminal device supporting two subscriber identities, if no data is sent for 200 ms consecutively, the access network device releases or deactivates the current RRC connection, so that the terminal device can return to the RRC connection established the other subscriber identity as soon as possible.

As an example instead of a limitation, the first indication information may include first duration information. The first duration information is used to indicate maximum duration in which the second RRC connection can be maintained, or is used to indicate the terminal device that the first RRC connection needs to be established or resumed within duration indicated by the first duration information.

The first indication information may be carried in a second RRC setup complete message or a second RRC resume complete message.

Alternatively, the first indication information may be carried in another RRC message, or a new RRC message may be introduced to send the first indication information.

According to the solution in this embodiment of this application, the terminal device may send the first indication information to notify the second access network device, so that the second access network device can release or deactivate the second RRC connection as soon as possible. In this way, the terminal device can return to the first RRC connection as soon as possible. For example, when the first RRC connection is released or deactivated due to data transmission performed with the second subscriber identity, the terminal device can return to the first RRC connection as soon as possible by sending the first indication information to the second access network device, to ensure data transmission of the first RRC connection.

Figure 6:
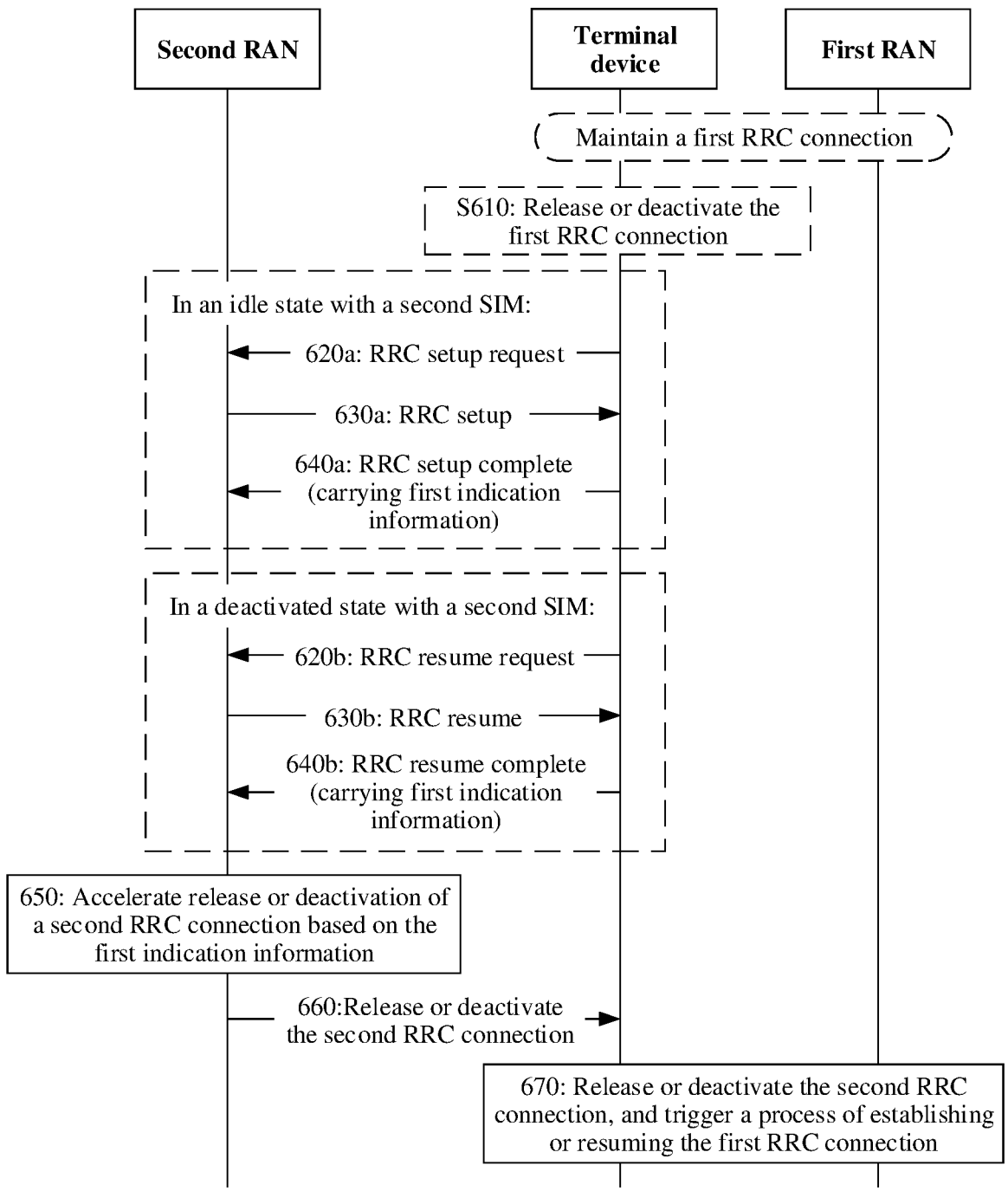
FIG. 6 is a schematic flowchart of a communication method according to another embodiment of this application.

FIG. 6 is a schematic diagram of a communication method 600 according to another embodiment of this application. The communication method 600 includes the following steps.

S610: A terminal device releases or deactivates a first RRC connection. S610 is an optional step.

S620 includes S620a or S620b. The terminal device is in an RRC idle state or an RRC deactivated state with a first subscriber identity.

S620a: The terminal device in the RRC idle state with a second SIM (an example of a second subscriber identity) sends an RRC setup request (RRC Setup Request) message to a second RAN (an example of a second access network device).

S620b: The terminal device in the RRC deactivated state with a second SIM sends an RRC resume request message to a second RAN.

S630 includes S630a or S630b, which are corresponding to S620a and S620b respectively.

S630a: The second RAN sends an RRC setup message to the terminal device.

S630b: The second RAN sends an RRC resume message to the terminal device.

S640 includes S640a or S640b, which are corresponding to S630a and S630b respectively.

S640a: The terminal device sends an RRC setup complete message to the second RAN, where the RRC setup complete message includes first indication information.

S640b: The terminal device sends an RRC resume complete message to the second RAN. The RRC resume complete message includes first indication information.

The first indication information includes: information about a status of the first RRC connection, information about that the terminal device needs to (after a second RRC connection is deactivated or released) return to the first RRC connection, or information about that the terminal device includes dual SIMs. The first indication information is used by the second RAN to release the second RRC connection more quickly.

As an example instead of a limitation, the first indication information may include first duration information. The first duration information may be used to indicate maximum duration in which the second RRC connection can be maintained, or used to indicate that the terminal device needs to establish or resume the first RRC connection within duration indicated by the first duration information.

As an example instead of a limitation, if handover occurs in the second RRC connection, a source second access network device may send indication information or remaining return duration to a target second access network device in the handover process. For example, the indication information or the remaining return duration is sent via a handover request or handover preparation message, so that the target second access network device can release the second RRC connection more quickly.

Alternatively, the terminal device may send an RRC message to the second RAN, where the first indication information is carried in the RRC message.

S650: The second RAN accelerates release or deactivation of the second RRC connection based on the first indication information, so that the terminal device returns to the first RRC connection more quickly.

As an example instead of a limitation, the second RAN may reduce duration of a user inactivity timer.

S660: The second RAN sends a message for releasing or deactivating the second RRC connection to the terminal device.

As an example instead of a limitation, the message for releasing or deactivating the second RRC connection may include third indication information, where the third indication information is used to indicate the terminal device to trigger to establish or resume the first RRC connection.

S670: The terminal device receives the message sent by the second RAN for releasing or deactivating the second RRC connection. The terminal device releases or deactivates the second RRC connection, where the message triggers the terminal device to initiate a process to establish or resume the first RRC connection.

According to the solution in this embodiment of this application, the terminal device sends the indication information to the second RAN, so that the second RAN releases or deactivates the RRC connection more quickly. In this way, the first RRC connection is established or resumed more quickly.

Figure 7:
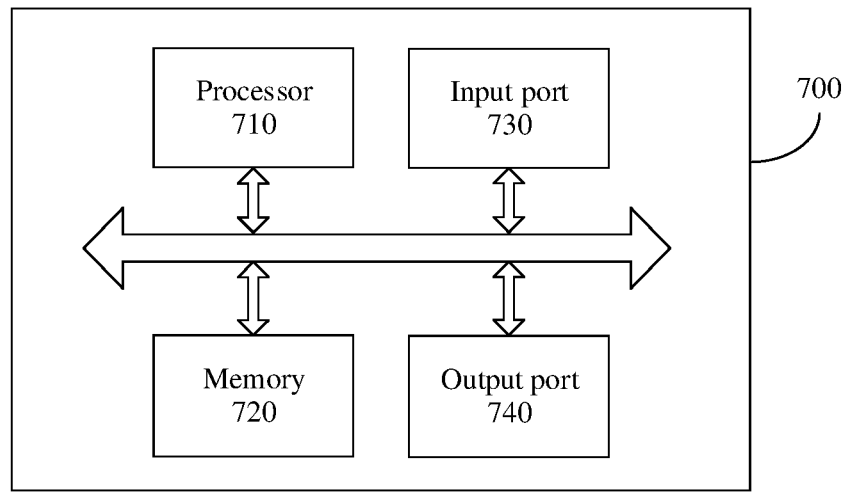
FIG. 7 is a schematic block diagram of a communication apparatus according to an embodiment of this application.

FIG. 7 is a schematic diagram of a wireless communication apparatus 700 according to an embodiment of this application. The apparatus 700 may be a terminal device, or may be a chip or a circuit, for example, a chip or a circuit that may be disposed in the terminal device.

The apparatus 700 may include a processing unit 710 (an example of the processing unit) and a storage unit 720. The storage unit 720 is configured to store instructions.

The processing unit 710 is configured to execute the instructions stored in the storage unit 720, so that the apparatus 700 implements the steps performed by the terminal device in the foregoing method.

Further, the apparatus 700 may further include an input port 730 and an output port 740. Further, the processing unit 710, the storage unit 720, the input port 730, and the output port 740 may communicate with each other through an internal connection path, to transmit control signals and/or data signals. The storage unit 720 is configured to store a computer program. The processing unit 710 may be configured to invoke the computer program from the storage unit 720 and run the computer program, to control the input port 730 to receive a signal, and control the output port 740 to send a signal, to complete the steps performed by the terminal device in the foregoing methods. The storage unit 720 may be integrated into the processing unit 710, or may be disposed separately from the processing unit 710.

Optionally, if the apparatus 700 is a communication device (for example, a terminal device), the input port 730 is a receiver, and the output port 740 is a transmitter. The receiver and the transmitter may be a same physical entity or different physical entities. When the receiver and the transmitter are a same physical entity, the receiver and the transmitter may be collectively referred to as a transceiver.

Optionally, if the apparatus 700 is the chip or the circuit, the input port 730 is an input interface and the output port 740 is an output interface.

In an implementation, it may be considered that functions of the input port 730 and the output port 740 may be implemented through a transceiver circuit or a dedicated transceiver chip. It may be considered that the processing unit 710 may be implemented by using a dedicated processing chip, a processing circuit, a processing unit, or a general-purpose chip.

In another implementation, it may be considered that the communication device provided in this embodiment of this application is implemented by using a general-purpose computer. To be specific, program code for implementing functions of the processing unit 710, the input port 730, and the output port 740 is stored in the storage unit 720, and a general-purpose processing unit implements the functions of the processing unit 710, the input port 730, and the output port 740 by executing the code in the storage unit 720.

In an implementation, the processing unit 710 is configured to control the output port 740 to send, with a first subscriber identity, a first message to a first access network device, where the first message is used to request to establish or resume a second RRC connection with a second subscriber identity. The first message includes auxiliary information, where the auxiliary information is used to indicate the first access network device to determine to release or deactivate a first RRC connection. The first RRC connection is a connection established with the first subscriber identity, and the second RRC connection is a connection established with the second subscriber identity. The processing unit 710 is further configured to control the input port 730 to receive, with the first subscriber identity, a second message from the first access network device, where the second message is used to indicate to release or deactivate the first RRC connection. The apparatus is in an RRC connected state with the first subscriber identity, and is in an RRC idle state or an RRC deactivated state with the second subscriber identity.

Optionally, the auxiliary information includes at least one of the following information: a reason for establishing or resuming the second RRC connection, a type of the second RRC connection, service type information or service priority information of the second RRC connection, expected duration of the second RRC connection, and capability information indicating whether the terminal device supports deactivation of the first RRC connection.

Optionally, the type of the second RRC connection includes a signaling sending connection and a data transmission connection.

Optionally, the second message includes delay indication information, where the delay indication information is used to indicate to delay releasing the first RRC connection or to delay deactivating the first RRC connection.

Optionally, the second message includes delay duration information, where the delay duration information is used to indicate duration of delaying releasing the first RRC connection or delaying deactivating the first RRC connection.

Optionally, the second message includes return indication information, where the return indication information is used to indicate to trigger to establish or resume the first RRC connection after the second RRC connection is released or deactivated.

Optionally, the second message includes return duration information, where the return duration information is used to indicate to establish or resume the first RRC connection within the return duration.

In another implementation, the processing unit 710 is configured to: after the first RRC connection is released or deactivated, establish or resume the second RRC connection with the second subscriber identity to a second access network device. The processing unit 710 is further configured to control the output port 740 to send first indication information to the second access network device, where the first indication information is used to indicate the second access network device to accelerate release or deactivation of the second RRC connection.

Optionally, the first indication information includes first duration information. The first duration information is used to indicate maximum duration in which the second RRC connection can be maintained, or is used to indicate that the first RRC connection needs to be established or resumed within duration indicated by the first duration information.

Optionally, the first indication information includes second indication information, where the second indication information is used to indicate a status of the first RRC connection.

Optionally, the first indication information is carried in a second RRC setup complete message or a second RRC resume complete message.

For concepts, explanations, detailed descriptions, and other steps of the apparatus 700 that are related to the technical solutions provided in embodiments of this application, refer to the descriptions of the content in the foregoing methods or other embodiments. Details are not described herein again.

The foregoing listed functions and actions of the modules or units in the apparatus 700 are merely examples for description. The apparatus 700 is configured in the terminal device or is the terminal device. The modules or units in the apparatus 700 may be configured to perform the actions or the processing processes performed by the terminal device in the foregoing methods. To avoid repetition, detailed descriptions are omitted.

Figure 8:
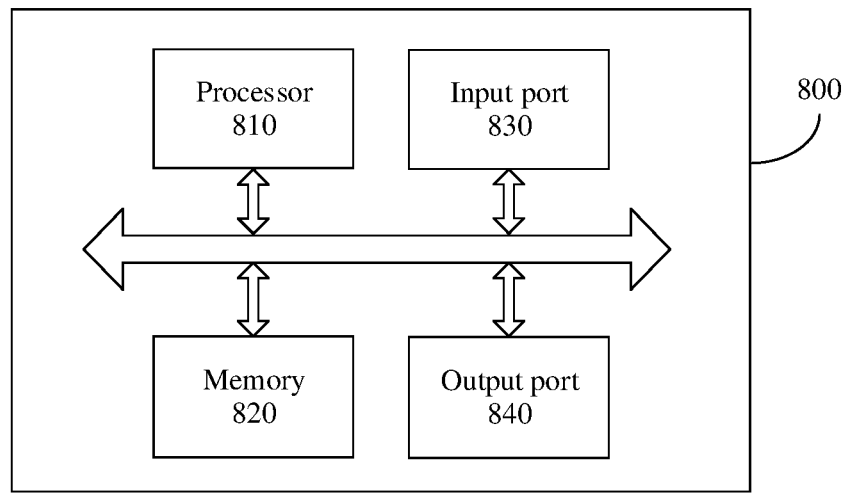
FIG. 8 is a schematic block diagram of a communication apparatus according to another embodiment of this application.

FIG. 8 is a schematic diagram of a wireless communication apparatus 800 according to an embodiment of this application.

The apparatus 800 may be an access network device (for example, a first access network device or a second access network device), or may be a chip or a circuit, for example, a chip or a circuit that may be disposed in the access network device.

The apparatus 800 may include a processing unit 810 (an example of the processing unit) and a storage unit 820. The storage unit 820 is configured to store instructions.

The processing unit 810 is configured to execute the instructions stored in the storage unit 820, so that the apparatus 800 implements the steps performed by the access network device (for example, the first access network device or the second access network device) in the foregoing method.

Further, the apparatus 800 may further include an input port 830 and an output port 840. Further, the processing unit 810, the storage unit 820, the input port 830, and the output port 840 may communicate with each other through an internal connection path, to transmit control signals and/or data signals. The storage unit 820 is configured to store a computer program. The processing unit 810 may be configured to invoke the computer program from the storage unit 820 and run the computer program, to control the input port 830 to receive a signal, and control the output port 840 to send a signal, to complete the steps performed by the access network device in the foregoing methods. The storage unit

820 may be integrated into the processing unit 810, or may be disposed separately from the processing unit 810.

Optionally, if the apparatus 800 is a communication device (for example, an access network device), the input port 830 is a receiver, and the output port 840 is a transmitter. The receiver and the transmitter may be a same physical entity or different physical entities. When the receiver and the transmitter are a same physical entity, the receiver and the transmitter may be collectively referred to as a transceiver.

Optionally, if the apparatus 800 is the chip or the circuit, the input port 830 is an input interface and the output port 840 is an output interface.

In an implementation, it may be considered that functions of the input port 830 and the output port 840 may be implemented through a transceiver circuit or a dedicated transceiver chip. It may be considered that the processing unit 810 may be implemented by using a dedicated processing chip, a processing circuit, a processing unit, or a general-purpose chip.

In another implementation, it may be considered that the communication device (for example, an access network device) provided in this embodiment of this application is implemented by using a general-purpose computer. To be specific, program code for implementing functions of the processing unit 810, the input port 830, and the output port 840 is stored in the storage unit 820, and a general-purpose processing unit implements the functions of the processing unit 810, the input port 830, and the output port 840 by executing the code in the storage unit 820.

In an implementation, the processing unit 810 is configured to control the input port 830 to receive a first message from a terminal device, where the first message is used to request to establish or resume a second RRC connection with a second subscriber identity. The first message includes auxiliary information, where the auxiliary information is used to indicate the first access network device to determine to release or deactivate a first RRC connection. The first RRC connection is a connection established by the terminal device with a first subscriber identity, and the second RRC connection is a connection established by the terminal device with the second subscriber identity. The processing unit 810 is further configured to determine, based on the auxiliary information, to release or deactivate the first RRC connection. The processing unit 810 is further configured to control the output port 840 to send a second message to the terminal device, where the second message is used to indicate to release or deactivate the first RRC connection.

Optionally, the auxiliary information includes at least one of the following information: a reason for establishing or resuming the second RRC connection, a type of the second RRC connection, service type information or service priority information of the second RRC connection, expected duration of the second RRC connection, and capability information indicating whether the terminal device supports deactivation of the first RRC connection.

Optionally, the type of the second RRC connection includes a signaling sending connection and a data transmission connection.

Optionally, the processing unit 810 is further configured to: after the first RRC connection is released or deactivated, determine, based on the auxiliary information, whether to initiate paging for the first subscriber identity.

Optionally, the second message includes delay indication information, where the delay indication information is used to indicate the terminal device to delay releasing the first RRC connection or delay deactivating the first RRC connection.

Optionally, the second message includes delay duration information, where the delay duration information is used to indicate duration of delaying releasing the first RRC connection or delaying deactivating the first RRC connection.

Optionally, the second message includes return indication information, where the return indication information is used to indicate the terminal device to trigger to establish or resume the first RRC connection after the second RRC connection is released or deactivated.

Optionally, the second message includes return duration information, where the return duration information is used to indicate the terminal device to establish or resume the first RRC connection within the return duration.

The foregoing listed functions and actions of the modules or units in the apparatus 800 are merely examples for description. When the apparatus 800 is configured in the access network device or is the access network device, the modules or units in the apparatus 800 may be configured to perform the actions or the processing processes performed by the access network device in the foregoing methods. Herein, to avoid repetition, detailed descriptions are omitted.

For concepts, explanations, detailed descriptions, and other steps of the apparatus 800 that are related to the technical solutions provided in embodiments of this application, refer to the descriptions of the content in the foregoing methods or other embodiments. Details are not described herein again.

Figure 9:
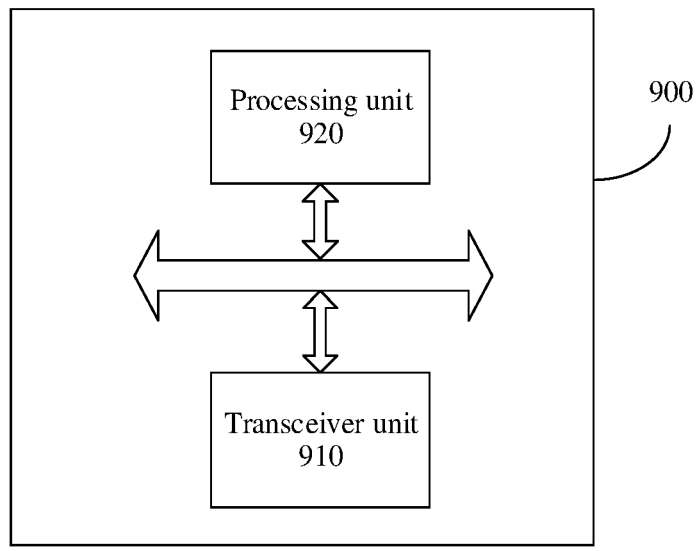
FIG. 9 is a schematic block diagram of a communication apparatus according to another embodiment of this application.

FIG. 9 is a schematic diagram of a wireless communication apparatus 900 according to an embodiment of this application. It should be understood that the apparatus 900 may perform the steps performed by the terminal device in the foregoing method embodiments.

In an implementation, the apparatus supports a first subscriber identity and a second subscriber identity, and includes a transceiver unit 910 and a processing unit 920. Alternatively, the transceiver unit 910 may include two units: a sending unit and a receiving unit.

The processing unit 920 may be configured to control the transceiver unit 910 to send a first message, with the first subscriber identity, to a first access network device, where the first message is used to request to establish or resume a second RRC connection with the second subscriber identity. The first message includes auxiliary information, where the auxiliary information is used to indicate the first access network device to determine to release or deactivate a first RRC connection. The first RRC connection is a connection established with the first subscriber identity, and the second RRC connection is a connection established with the second subscriber identity. The processing unit 920 is further configured to control the transceiver unit 910 to receive, with the first subscriber identity, a second message from the first access network device, where the second message is used to indicate to release or deactivate the first RRC connection. The apparatus is in an RRC connected state with the first subscriber identity, and is in an RRC idle state or an RRC deactivated state with the second subscriber identity.

Optionally, the processing unit 920 may be configured to: after the first RRC connection is released or deactivated, establish or resume the second RRC connection with the second subscriber identity to a second access network device. The transceiver unit 910 may be further configured to send first indication information to the second access network device, where the first indication information is used to indicate the second access network device to accelerate release or deactivation of the second RRC connection.

Figure 10:
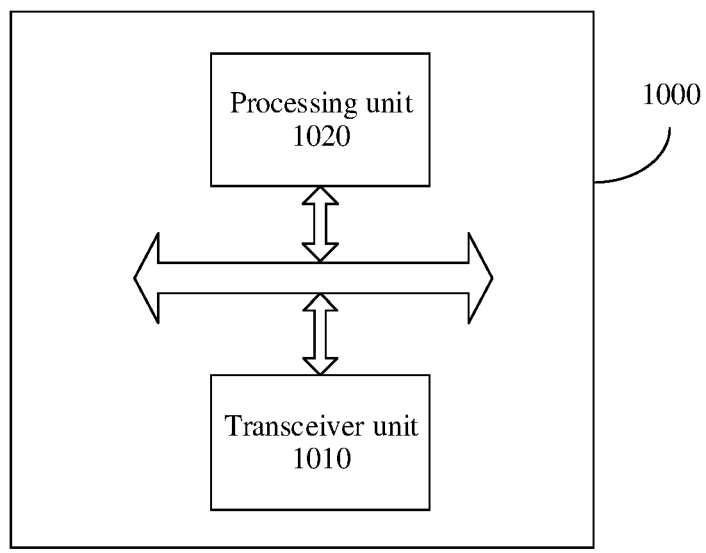
FIG. 10 is a schematic block diagram of a communication apparatus according to another embodiment of this application.

FIG. 10 is a schematic diagram of a wireless communication apparatus 1000 according to an embodiment of this application. It should be understood that the apparatus 1000 may perform steps performed by the first access network device or the second access network device in the foregoing method embodiments.

The apparatus 1000 includes a transceiver unit 1010 and a processing unit 1020. Alternatively, the transceiver unit may include two units: a sending unit and a receiving unit.

In an implementation, the processing unit 1020 may be configured to control the transceiver unit 1010 to receive a first message from a terminal device, where the first message is used to request to establish or resume a second RRC connection with a second subscriber identity. The first message includes auxiliary information, where the auxiliary information is used to indicate the first access network device to determine to release or deactivate a first RRC connection. The first RRC connection is a connection established by the terminal device with a first subscriber identity, and the second RRC connection is a connection established by the terminal device with the second subscriber identity. The terminal device is in an RRC connected state with the first subscriber identity, and is in an RRC idle state or an RRC deactivated state with the second subscriber identity. The processing unit 1020 may be further configured to determine, based on the auxiliary information, to release or deactivate the first RRC connection. The processing unit may be further configured to control the transceiver unit 1010 to send a second message to the terminal device, where the second message is used to indicate to release or deactivate the first RRC connection.

In another implementation, the processing unit 1020 may be configured to establish or resume a second RRC connection to a terminal device. The processing unit 1020 may be further configured to control the transceiver unit 1010 to receive first indication information from the terminal device, where the first indication information is used to indicate accelerating release or deactivation of the second RRC connection.

Figure 11:
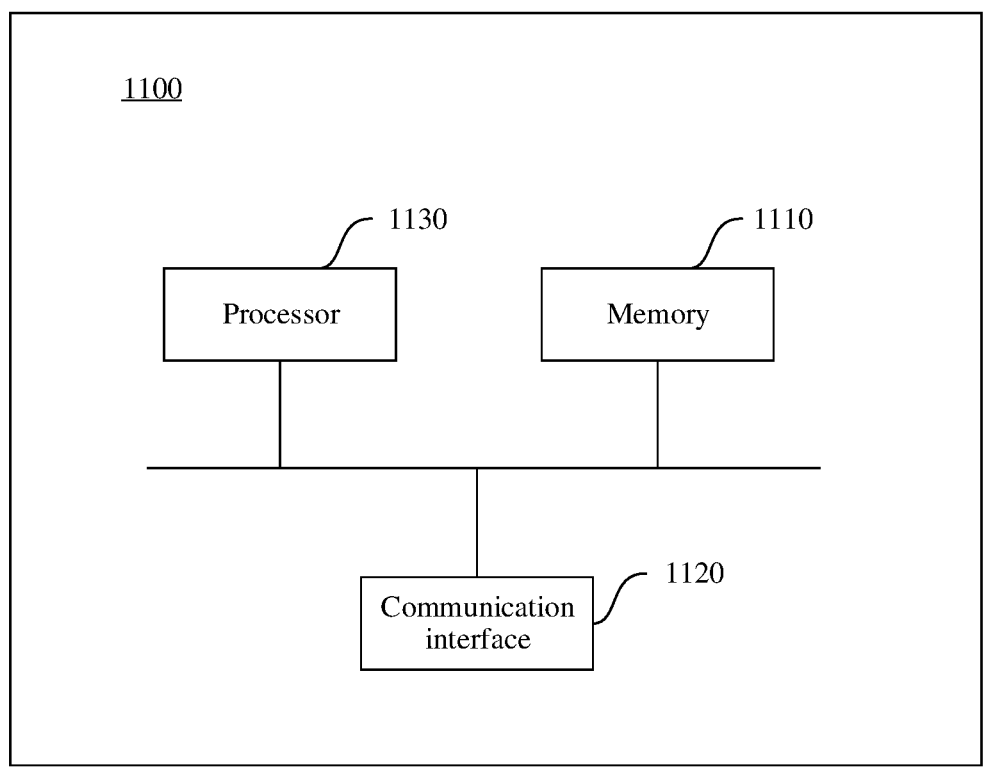
FIG. 11 is a schematic block diagram of a communication apparatus according to another embodiment of this application.

FIG. 11 is a schematic block diagram of a communication apparatus 1100 according to an embodiment of this application. It should be understood that the communication apparatus may be configured to perform steps performed by the terminal device in the foregoing method embodiments, or may be configured to perform steps performed by the access network device in the foregoing method embodiments. To avoid repetition, details are not described herein again. The communication apparatus 1100 includes a memory 100, a communication interface 1120, and a processor 1130.

The memory 1110 is configured to store a program, and the memory 1110 is an optional module.

The communication interface 1120 is configured to communicate with another device.

The processor 1130 is configured to execute the program in the memory 1110.

It should be understood that the communication apparatus 1100 shown in FIG. 11 may be a chip or a circuit, for example, a chip or a circuit that may be disposed in a terminal device, or a chip or a circuit that may be disposed in an access network device. The communication interface 1120 may alternatively be a transceiver. The transceiver includes a receiver and a transmitter. Further, the communication apparatus 1100 may further include a bus system.

The processor 1130, the memory 1110, the receiver, and the transmitter are connected through the bus system. The processor 1130 is configured to execute instructions stored in the memory 1110, to control the receiver to receive a signal and control the transmitter to send a signal, thereby completing the steps performed by the terminal device or the access network device in the communication methods in this application. The receiver and the transmitter may be a same physical entity or different physical entities. When the receiver and the transmitter are a same physical entity, the receiver and the transmitter may be collectively referred to as a transceiver. The memory 100 may be integrated in the processor 1130, or may be disposed separately from the processor 1130.

In an implementation, it may be considered that functions of the receiver and the transmitter may be implemented through a transceiver circuit or a dedicated transceiver chip. It may be considered that the processor 1130 may be implemented by using a dedicated processing chip, a processing circuit, a processor, or a general-purpose chip.

Figure 12:
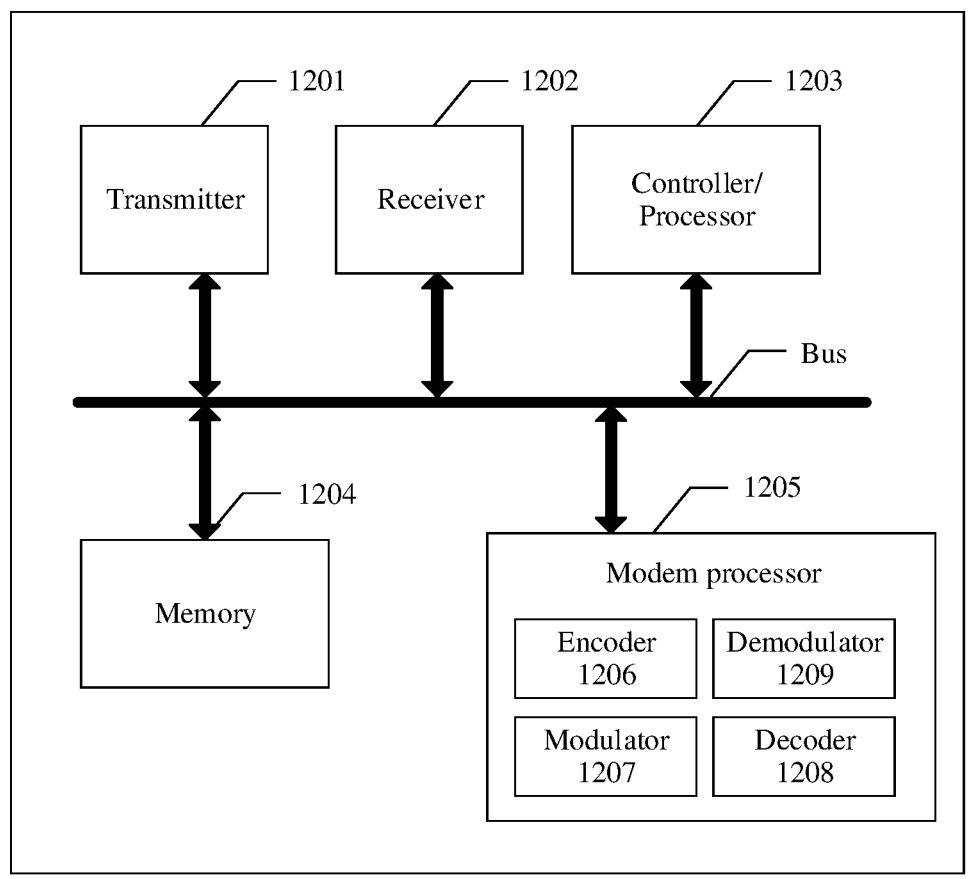
FIG. 12 is a schematic block diagram of a terminal device according to an embodiment of this application.

FIG. 12 is a simplified schematic diagram of a possible design structure of a terminal device in the foregoing embodiments. The terminal device includes a transmitter 1201, a receiver 1202, a controller/processor 1203, a memory 1204, and a modem processor 1205.

The transmitter 1201 is configured to send an uplink signal, where the uplink signal is transmitted to the access network device in the foregoing embodiments through an antenna. In downlink, the antenna receives a downlink signal transmitted by the access network device in the foregoing embodiments. The receiver 1202 is configured to receive the downlink signal received from the antenna. In the modem processor 1205, an encoder 1206 receives service data and a signaling message that are to be sent in uplink, and processes the service data and the signaling message. A modulator 1207 further processes (for example, performs symbol mapping and modulation) the encoded service data and signaling message and provides an output sample. A demodulator 1209 processes (for example, demodulates) the input sample and provides symbol estimation. A decoder 1208 processes (for example, decodes) the symbol estimation and provides decoded data and a decoded signaling message that are to be sent to the terminal device. The encoder 1206, the modulator 1207, the demodulator 1209, and the decoder 1208 may be implemented by the combined modem processor 1205. The units perform processing based on a radio access technology used by a radio access network.

The controller/processor 1203 controls and manages an action of the terminal device and is configured to perform processing performed by the terminal device in the foregoing embodiments. For example, the controller/processor 1203 is configured to control the terminal device to: receive a second message from a first access network device, release or deactivate a first RRC connection based on the second message and/or perform another process of the technology described in this application. For example, the controller/processor 1203 is configured to support the terminal device to perform processes S410 and S420 in FIG. 4.

Persons of ordinary skill in the art may be aware that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, an access network device, or the like) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A wireless communication method, comprising:
   sending, with a first subscriber identity, by a terminal device that supports the first subscriber identity and a second subscriber identity, a first message to a first access network device, wherein the first message requests establishment or resumption of a second radio resource control (RRC) connection with the second subscriber identity, wherein the first message comprises auxiliary information, wherein the auxiliary information indicates to the first access network device to determine to release or deactivate a first RRC connection, wherein the first RRC connection is a connection established with the first subscriber identity, and wherein the second RRC connection is a connection established with the second subscriber identity; and
   receiving, with the first subscriber identity, a second message from the first access network device, wherein the second message indicates to release or deactivate the first RRC connection, wherein the terminal device is in an RRC connected state with the first subscriber identity when the first message is sent, and wherein the terminal device is in an RRC idle state or an RRC deactivated state with the second subscriber identity when the second message is received.

2. The wireless communication method according to claim 1, wherein the auxiliary information comprises at least one of a reason for establishing or resuming the second RRC connection, a type of the second RRC connection, at least one of service type information or service priority information of the second RRC connection, an expected duration of the second RRC connection, or capability information indicating whether the terminal device supports deactivation of the first RRC connection.

3. The wireless communication method according to claim 1, wherein the second message comprises delay indication information, and wherein the delay indication information indicates to at least one of delay releasing the first RRC connection or delay deactivating the first RRC connection.

4. The wireless communication method according to claim 1, wherein the second message comprises delay duration information, and wherein the delay duration information indicates a duration of at least one of delaying releasing the first RRC connection or delaying deactivating the first RRC connection.

5. The wireless communication method according to claim 1, wherein the second message comprises return indication information, and wherein the return indication information indicates to trigger at least one of establishment or resumption of the first RRC connection after the second RRC connection is released or deactivated.

6. The wireless communication method according to claim 1, wherein the second message comprises return duration information, and wherein the return duration information indicates to establish or resume the first RRC connection within the return duration.

7. The wireless communication method according to claim 1, further comprising:
   after the releasing or deactivating the first RRC connection, establishing or resuming the second RRC connection with the second subscriber identity to a second access network device; and
   sending first indication information to the second access network device, wherein the first indication information indicates the second access network device to accelerate release or deactivation of the second RRC connection.

8. A wireless communication method, comprising:
   receiving a first message from a terminal device, wherein the first message requests at least one of establishment or resumption of a second radio resource control (RRC) connection with a second subscriber identity, wherein the first message comprises auxiliary information, wherein the auxiliary information indicates to release or deactivate a first RRC connection, wherein the first RRC connection is a connection established by the terminal device with a first subscriber identity, and wherein the second RRC connection is a connection established by the terminal device with the second subscriber identity;

determining, based on the auxiliary information, to release or deactivate the first RRC connection; and sending a second message to the terminal device, wherein the second message indicates to release or deactivate the first RRC connection, and wherein the terminal device is in an RRC connected state with the first subscriber identity when the terminal device sends the first message, and wherein the terminal device is in an RRC idle state or an RRC deactivated state with the second subscriber identity when the second message is sent.

9. The wireless communication method according to claim 8, wherein the auxiliary information comprises at least one of a reason for establishing or resuming the second RRC connection, a type of the second RRC connection, service type information or service priority information of the second RRC connection, an expected duration of the second RRC connection; or capability information indicating whether the terminal device supports deactivation of the first RRC connection.

10. The wireless communication method according to claim 8, further comprising determining, after the first RRC connection is released or deactivated, whether to initiate paging for the first subscriber identity based on the auxiliary information.

11. The wireless communication method according to claim 8, wherein the second message comprises delay indication information, and wherein the delay indication information indicates to at least one of delay releasing the first RRC connection or delay deactivating the first RRC connection.

12. The wireless communication method according to claim 8, wherein the second message comprises delay duration information, and wherein the delay duration information indicates a duration of at least one of delaying releasing the first RRC connection or delaying deactivating the first RRC connection.

13. The wireless communication method according to claim 8, wherein the second message comprises return indication information, and wherein the return indication information indicates to the terminal device to trigger at least one of establishment or resumption of the first RRC connection after the second RRC connection is released or deactivated.

14. The wireless communication method according to claim 8, wherein the second message comprises return duration information, and wherein the return duration information indicates to the terminal device to establish or resume the first RRC connection within the return duration.

15. An apparatus, comprising:
one or more processors; and
one or more memories coupled to the one or more processors and storing programming instructions for execution by the one or more processors, the programming instructions including instructions to:

send, with a first subscriber identity, a first message to a first access network device, wherein the apparatus supports the first subscriber identity and a second subscriber identity, wherein the first message requests at least one of establishment or resumption of a second radio resource control (RRC) connection with the second subscriber identity, wherein the first message comprises auxiliary information, wherein the auxiliary information indicates to the first access network device to determine to release or deactivate a first RRC connection, wherein the first RRC connection is a connection established with the first subscriber identity, and wherein the second RRC connection is a connection established with the second subscriber identity; and receive, with the first subscriber identity, a second message from the first access network device, wherein the second message indicates to release or deactivate the first RRC connection, wherein the apparatus is in an RRC connected state with the first subscriber identity when the first message is sent, and wherein the apparatus is in an RRC idle state or an RRC deactivated state with the second subscriber identity when the second message is received.

16. The apparatus according to claim 15, wherein the auxiliary information comprises at least one of a reason for establishing or resuming the second RRC connection, a type of the second RRC connection, service type information or service priority information of the second RRC connection, an expected duration of the second RRC connection, or capability information indicating whether the apparatus supports deactivation of the first RRC connection.

17. The apparatus according to claim 15, wherein the second message comprises delay indication information, and wherein the delay indication information indicates to at least one of delay releasing the first RRC connection or delay deactivating the first RRC connection.

18. The apparatus according to claim 15, wherein the second message comprises delay duration information, and being the delay duration information indicates a duration of at least one of delaying releasing the first RRC connection or delaying deactivating the first RRC connection.

19. The apparatus according to claim 15, wherein the second message comprises return indication information, and being the return indication information indicates to trigger at least one of establishment or resumption of the first RRC connection after the second RRC connection is released or deactivated.

20. The apparatus according to claim 15, wherein the second message comprises return duration information, and being the return duration information indicates to establish or resume the first RRC connection within the return duration.

* * * * *